United States Patent
Kadono et al.

(10) Patent No.: US 9,729,894 B2
(45) Date of Patent: *Aug. 8, 2017

(54) MOVING PICTURE PREDICTION METHOD, MOVING PICTURE CODING METHOD AND APPARATUS, AND MOVING PICTURE DECODING METHOD AND APPARATUS

(71) Applicant: Godo Kaisha IP Bridge 1, Tokyo (JP)

(72) Inventors: Shinya Kadono, Fukuoka (JP); Chong Soon Lim, Singapore (SG); Teck Wee Foo, Singapore (SG); Sheng Mei Shen, Singapore (SG)

(73) Assignee: GODO KAISHA IP BRIDGE 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,026

(22) Filed: Aug. 22, 2016

(65) Prior Publication Data

US 2016/0360222 A1 Dec. 8, 2016

Related U.S. Application Data

(62) Division of application No. 14/950,484, filed on Nov. 24, 2015, now Pat. No. 9,451,276, which is a division
(Continued)

(30) Foreign Application Priority Data

Nov. 20, 2002 (JP) .................................. 2002-336294
Nov. 25, 2002 (JP) .................................. 2002-340391

(51) Int. Cl.
  *H04N 19/51* (2014.01)
  *H04N 19/105* (2014.01)
(Continued)

(52) U.S. Cl.
  CPC .......... *H04N 19/51* (2014.11); *H04N 19/105* (2014.11); *H04N 19/114* (2014.11);
(Continued)

(58) Field of Classification Search
  CPC .. H04N 19/105; H04N 19/114; H04N 19/119; H04N 19/172; H04N 19/176;
(Continued)

(56) References Cited

U.S. PATENT DOCUMENTS 5,067,014 A  11/1991  Bergen et al.
5,642,166 A   6/1997  Shin et al.
(Continued)

FOREIGN PATENT DOCUMENTS

EP  0 719 049      6/1996
EP  0 840 512 A2   5/1998
(Continued)

OTHER PUBLICATIONS

Supplementary European Search Report issued Nov. 3, 2008 in European Application No. 03 81 1486.
(Continued)

*Primary Examiner* — Behrooz Senfi
(74) *Attorney, Agent, or Firm* — Wenderoth, Lind & Ponack, L.L.P.

(57) ABSTRACT

An image decoding method is provided which includes a time information determination step of determining time information of a current picture, a first reference picture referred to by the current picture and a second reference picture referred to by the current picture; a scaling parameter calculation step of calculating a scaling parameter based on a time distance between the first reference picture and a second reference picture; a weighting coefficient determination step of determining two weighting coefficients based on the scaling parameter; a predictive pixel value generation
(Continued)

step of generating a predictive pixel value of the current picture by scaling a pixel value of the first reference picture and a pixel value of the second reference picture using the two weighting coefficients determined in the weighting coefficient determination step; and a decoding step of decoding the current picture using the predictive pixel value.

2 Claims, 16 Drawing Sheets

Related U.S. Application Data of application No. 14/508,438, filed on Oct. 7, 2014, now Pat. No. 9,232,220, which is a division of application No. 14/021,315, filed on Sep. 9, 2013, now Pat. No. 8,885,713, which is a division of application No. 13/475,179, filed on May 18, 2012, now Pat. No. 8,553,770, which is a division of application No. 12/823,527, filed on Jun. 25, 2010, now Pat. No. 8,204,119, which is a division of application No. 12/341,223, filed on Dec. 22, 2008, now Pat. No. 7,848,411, which is a division of application No. 10/500,801, filed as application No. PCT/JP03/11286 on Sep. 4, 2003, now Pat. No. 7,542,510.

(51) Int. Cl.
    *H04N 19/503* (2014.01)
    *H04N 19/172* (2014.01)
    *H04N 19/577* (2014.01)
    *H04N 19/114* (2014.01)
    *H04N 19/182* (2014.01)
    *H04N 19/119* (2014.01)
    *H04N 19/176* (2014.01)
    *H04N 19/31* (2014.01)

(52) U.S. Cl.
    CPC ......... *H04N 19/119* (2014.11); *H04N 19/172* (2014.11); *H04N 19/176* (2014.11); *H04N 19/182* (2014.11); *H04N 19/31* (2014.11); *H04N 19/503* (2014.11); *H04N 19/577* (2014.11)

(58) Field of Classification Search
    CPC .... H04N 19/182; H04N 19/503; H04N 19/51; H04N 19/577
    USPC ..................................................... 375/240.12
    See application file for complete search history.

(56) References Cited

U.S. PATENT DOCUMENTS

| | | | |
|---|---|---|---|
| 5,802,063 A | 9/1998 | Deiss | |
| 5,959,672 A | 9/1999 | Sasaki | |
| 6,173,078 B1 | 1/2001 | Kadono | |
| 6,295,376 B1 | 9/2001 | Nakaya | |
| 6,353,683 B1 | 3/2002 | Horiike | |
| 6,377,713 B1 | 4/2002 | Vuong | |
| 6,404,814 B1 | 6/2002 | Apostolopoulos et al. | |
| 6,445,826 B1 | 9/2002 | Kadono | |
| 6,466,732 B1 | 10/2002 | Kimura et al. | |
| 6,473,462 B1 | 10/2002 | Chevance et al. | |
| 6,487,315 B2 | 11/2002 | Kadono | |
| 6,529,632 B1 | 3/2003 | Nakaya et al. | |
| 6,560,367 B1 | 5/2003 | Nakaya | |
| 6,564,004 B1 | 5/2003 | Kadono | |
| 6,577,679 B1 | 6/2003 | Apostolopoulos | |
| 6,597,814 B2 | 7/2003 | Kadono | |
| 7,327,788 B2 | 2/2008 | Kadono | |
| 7,542,510 B2 | 6/2009 | Kadono et al. | |
| 7,630,435 B2 | 12/2009 | Chen et al. | |
| 7,848,411 B2 | 12/2010 | Kadono et al. | |
| 8,204,119 B2* | 6/2012 | Kadono | H04N 19/114 375/240.12 |
| 8,553,770 B2 | 10/2013 | Kadono et al. | |
| 8,885,713 B2* | 11/2014 | Kadono | H04N 19/114 348/412.1 |
| 9,232,220 B2* | 1/2016 | Kadono | H04N 19/114 |
| 9,451,276 B2* | 9/2016 | Kadono | H04N 19/114 |
| 2001/0028745 A1 | 10/2001 | Nakaya | |
| 2001/0040700 A1 | 11/2001 | Hannuksela et al. | |
| 2001/0050957 A1 | 12/2001 | Nakaya et al. | |
| 2001/0053186 A1 | 12/2001 | Nakaya | |
| 2010/0329350 A1 | 12/2010 | Abe et al. | |

FOREIGN PATENT DOCUMENTS

| | | |
|---|---|---|
| EP | 0 840 512 A3 | 5/1998 |
| EP | 0 880 277 A2 | 11/1998 |
| EP | 0 880 277 A3 | 11/1998 |
| EP | 1 239 667 A2 | 9/2002 |
| JP | 4-268892 | 9/1992 |
| JP | 9-163376 | 6/1997 |
| JP | 10-224795 | 8/1998 |
| JP | 11-239352 | 8/1999 |
| JP | 2002-232881 | 8/2002 |
| JP | 4178088 | 11/2008 |
| TW | 411698 | 11/2000 |
| TW | 450007 | 8/2001 |
| TW | 457816 | 10/2001 |
| TW | 465227 | 11/2001 |
| WO | 01/58166 | 8/2001 |

OTHER PUBLICATIONS

International Search Report issued Dec. 16, 2003 in International Application No. PCT/JP03/11286.
Mexican Office Action issued Feb. 21, 2008, in Mexican application No. PA/a/2004/006643, which is a foreign counterpart to the present application (and its English translation).
JVT: "Editor's Proposed Draft Text Modifications for Joint Video Specification (ITU-T Rec. H.264 ISO/IEC 14496-10 AVC), Geneva modifications draft 37", Joint Video Team (JVT) of ISO/IEC MPEG & ITU-T VCEG (ISO/IEC JTC1/SC29/WG11 and ITU-T SG16 Q.6, 5th Meeting: Geneva, CH, No. JVT-E146d37, Oct. 9, 2002-Oct. 17, 2002, XP002500850.
Chong-Soon Levi et al.: "Implicit Weighted Predication using Single Weight", Joint Video Team (JVT) of ISO/IEC MPEG & ITU-T VCEG (ISO/IEC JTC1/SC29/WG11 and ITU-T SG16 Q.6), 6th Meeting: AWAJI, Island, JP, No. JVT-F080, Dec. 5, 2002-Dec. 13, 2002, XP002500851.
Jill Boyce: "Changes to Adaptive Reference Picture Weighting", Joint Video Team (JVT of ISO/IEC MPEG & ITU-T VCEG (ISO/IEC JTC1/SC29/WG11 and ITU-T SG16 Q.6), 5th Meeting: Geneva, CH, No. JVT-E060, Oct. 9, 2002-Oct. 17, 2002, XP002500852.
Shinya Kadono et al.: "Implicit Weighted Bi-predication using DC Offset", Joint Video Team (JVT) of ISO/IEC MGEP & ITU-T VCEG (ISO/IEC JTC1/SC29/WG11 and ITU-T SG16 Q.6), 5th Meeting: Geneva, CH, No. JVT-E077, Oct. 9, 2002-Oct. 17, 2002, XP030005494.
Search Report issued Jun. 24, 2013 in corresponding Taiwanese Application No. 099109131 (with English translation).
Office Action issued Nov. 1, 2016 in U.S. Appl. No. 15/243,006.

* cited by examiner

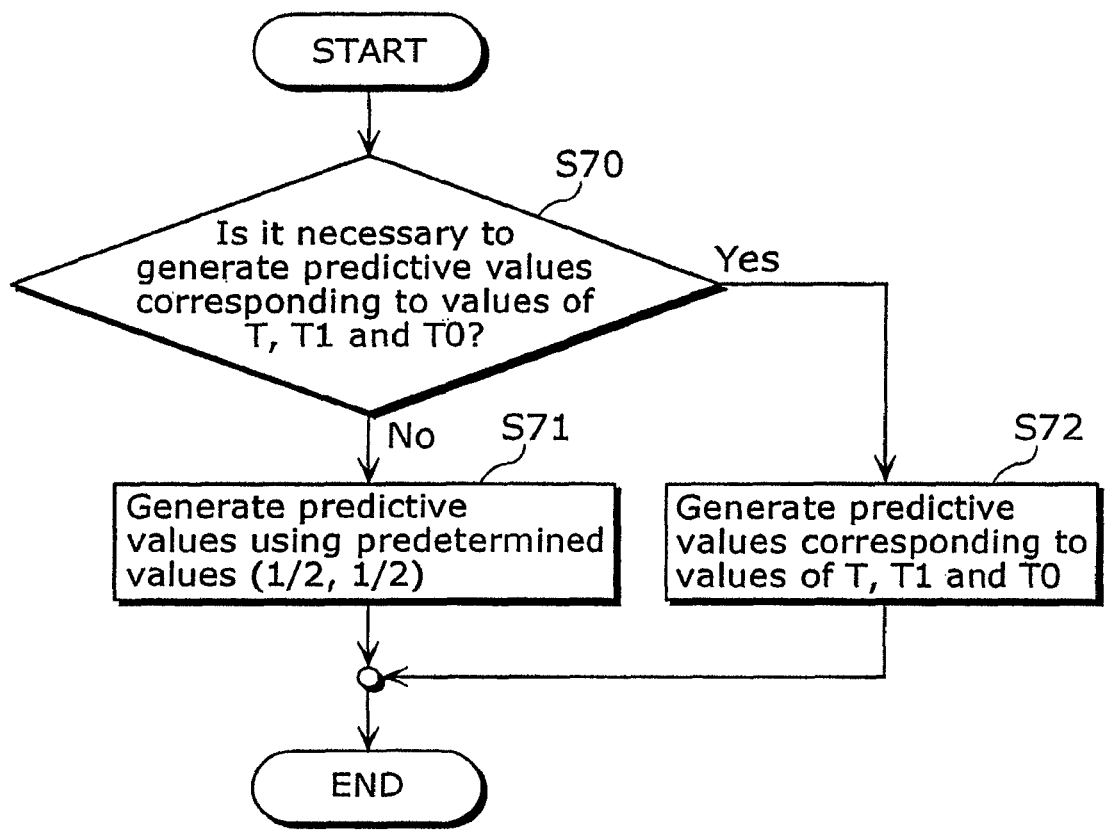

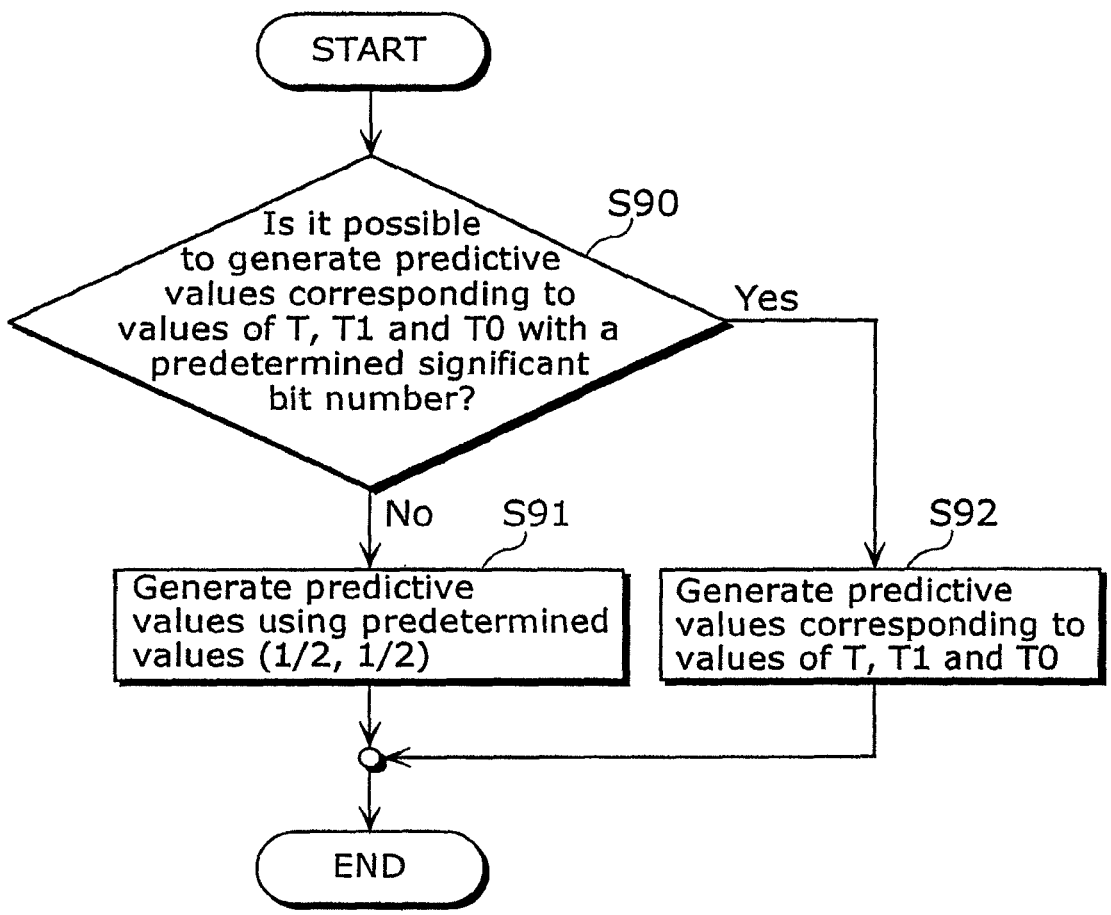

MOVING PICTURE PREDICTION METHOD, MOVING PICTURE CODING METHOD AND APPARATUS, AND MOVING PICTURE DECODING METHOD AND APPARATUS

TECHNICAL FIELD

The present invention relates to a prediction method of a pixel value in a moving picture, and particularly to a prediction method for performing temporally scaling processing based on two pictures.

BACKGROUND ART

Generally in moving picture coding, the amount of information is compressed using redundancy in spatial direction and temporal direction that a moving picture has. There is inter picture prediction coding as a method for using the redundancy in temporal direction. In the inter picture prediction coding, a temporary preceding picture or a temporary subsequent picture is used as a reference picture when a picture is coded. Then, motion amount is detected from the reference picture and the amount of information is compressed by removing redundancy in spatial direction toward a difference value between a picture to which motion compensation is performed and a picture to be coded.

In such a moving picture coding method, a picture that does not perform inter picture prediction coding, or equivalently, that performs intra picture prediction coding is called an I picture. Now, a picture means one unit of coding including both of a frame and a field. Additionally, a picture that performs the inter picture prediction coding with reference to one previously processed picture is called a P picture while a picture that performs the inter picture prediction coding with reference to two previously processed picture is called a B picture.

As for a B picture, its pixel values are predicted (also called "weighted prediction") and its motion vector is calculated based on two reference pictures and by scaling processing (a proportional calculation based on the distances among the B picture and the two reference pictures). As the distances among the pictures, there are a difference in time information that the pictures have, a difference in picture numbers assigned to each picture, and a difference in information showing the display order of pictures.

FIG. 1 shows an example of prior art that indicates process for calculating predictive pixel values in a B picture by weighted prediction based on two reference pictures. As shown in the figure, a predictive pixel value P is determined by weighted addition using the pixel values PO and P1 of two reference picture blocks 1 and 2. Both of weighting coefficients a and b in the formula are, for example, ½.

FIG. 2 and FIG. 3 show other examples that indicate the process for calculating predictive pixel values in a B picture (a block to be coded) by performing scaling based on two reference pictures (blocks 1 and 2) (for example, refer to Joint Video Team (JTV) of ISO/IEC MPEG and ITU-T VCEG Joint Committee Draft 2002-05-10, JVT-C167 11.). Here, FIG. 2 shows an example when a B picture (a block to be coded) refers to a forward picture (block 1) and a backward picture (block 2) while FIG. 3 shows an example when a B picture (a block to be coded) refers to two forward pictures (blocks 1and 2). By the way, W0 and W1 in the figures are weighting coefficients in scaling processing (here, weighted prediction of a pixel value). W0 is a weighting coefficient by which the pixel value in the block 1 is multiplied while W1 is a weighting coefficient by which the pixel value in the block 2 is multiplied. W0 and W1 are expressed by the following formulas.

$$W0=(128\times(T1-T))/(T1-T0) \quad \text{(Formula 1)}$$

$$W1=(128\times(T-T0))/(T1-T0) \quad \text{(Formula 2)}$$

Here, T, T0, and T1 are time (such as a time stamp) added to the block to be coded, the forward reference block 1 and the backward reference block 2, respectively.

At this time, the pixel value P in the block to be coded is expressed by the following formula.

$$P=(P0\times W0+P1\times W1+64)>>7 \quad \text{(Formula 3)}$$

Here, ">>" means a bit sift to the right direction. In other words, ">>7" means "÷(2 to the 7th power)". In addition, the above-mentioned Formula 3 is used when the pixel value indicates the value of a luminance signal. When the pixel value indicates the value of chrominance, the chrominance is expressed by the following formula.

$$P=128+((P0-128)\times W0+(P1-128)\times W1+64)>>7 \quad \text{(Formula 4)}$$

FIG. 4 is a flowchart showing concrete calculation steps using these formulas. After Time T, T1 and T0 and pixel values P0 and P1 are obtained (Step S401), whether Time T1 is equal to Time 0, in other words, whether the denominator of the weighting coefficients W0 and W1 in Formulas 1 and 2 is 0 or not is judged (Step S402). When the denominator is 0 (Yes; Step S402), it is determined that the weighting coefficients W0 and W1 are both 128 (Step S403). When the denominator is not 0 (No; Step 402), the weighting coefficients W0 and W1 are calculated according to above-mentioned Formulas 1 and 2 (Step S404). Lastly, the predictive pixel value P in the block to be coded is calculated using the weighting coefficients W0 and W1 and the pixel value P0 in the reference block 1 and the pixel value P1 in the reference block 2 according to above-mentioned Formula 3 or Formula 4 (Step S405). As described above, the predictive pixel value in the block to be coded is calculated using the pixel values in the two reference blocks and performing temporal scaling.

Incidentally, in temporal scaling processing like this, divisions are necessary to calculate weighting coefficients as above-mentioned Formulas 1 and 2 show. Since the resource necessary for divisions is larger than that necessary for multiplications, it is common to calculate reciprocals of divisions in advance, store them in a look-up table and the like and perform multiplications using the reciprocals in stead of performing divisions.

Note that the block 1 and the block 2 in FIGS. 1 to 3 are P pictures but it is acceptable that the blocks are I pictures or B pictures and are not necessarily P pictures.

In the method using the reciprocals calculated in advance, however, when the kinds of divisions in formulas for calculating weighting coefficients are many, the kinds of reciprocals calculated in advance also become many. For example, when possible values of T0 and T1 shown in Formulas 1 and 2 are 30 ways, respectively, by a simple calculation, 900 ways of divisions are necessary for calculating reciprocals and the reciprocal calculation amount becomes extremely large. Further, there is another problem that large storage capacity of the look-up table and the like that store the reciprocals is necessary.

Moreover, when the denominators (the devisors of the weighting coefficients) in above-mentioned Formulas 1 and 2 become small, the weighting coefficients (the quotients) become extremely large and there is a problem, for example, that the predictive pixel values cross a value that can be expressed by 16 bits. Therefore, for example, a 32-bit calculation becomes necessary and since the significant digit number necessary for the calculations increases, the size of a calculation apparatus becomes large.

DISCLOSURE OF INVENTION

In view of the foregoing, it is an object of the present invention to provide a moving picture prediction method and the like that enable the storage capacity of the memory to be small in a prediction of a moving picture by temporal scaling processing and when the reciprocals of the divisors used there are calculated in advance and are stored in memory.

Additionally, it is another object of this invention to provide a moving picture prediction method and the like that enable the calculations in the prediction of a moving picture by the temporal scaling processing to be a small size without increasing the significant digit number necessary for the calculations.

To achieve the above-mentioned objectives, the moving picture prediction method according to the present invention is a moving picture prediction method for predicting pixel values in a picture that forms a moving picture based on pixel values in two reference pictures, the method comprising: a first parameter calculation step of calculating a first parameter corresponding to a distance between a current picture and a first reference picture; a second parameter calculation step of calculating a second parameter corresponding to a distance between the first reference picture and a second reference picture; a first judgment step of judging whether a third parameter calculated based on the first and the second parameters is included in a predetermined range or not; a first prediction step of calculating pixel values in the current picture by scaling based on the first and the second parameters and pixel values in the first and the second reference pictures when a result of the judgment in the first judgment step shows that the third parameter is included in the predetermined range; and a second prediction step of calculating pixel values in the current picture by scaling based on predetermined values and pixel values in the first and the second reference pictures when a result of the judgment in the first judgment step shows that the third parameter is not included in the predetermined range.

Here, the scaling processing is the processing for obtaining each weighting coefficient when the pixel value in a current picture is calculated from the pixel values in two reference pictures.

Hereby, a limit is put on the third parameter that is one of the values of the weighting coefficients in the scaling processing. When the weighting coefficients are within a predetermined range, the scaling processing is performed using the weighting coefficients but when the weighting coefficients are out of the predetermined range, the weighting coefficients are made to be predetermined values and the scaling processing using the weighting coefficients is performed. Therefore, when the pixel value in a current picture, it is always possible to calculate with a predetermined significant bit number.

Moreover, it is preferable that the moving picture prediction method according to claim 1 further comprising: a second judgment step of judging whether the first parameter is included in a predetermined range or not, wherein the second prediction step is executed when a result of the judgment in the second judgment step shows that the first parameter is not included in the predetermined range.

Hereby, a limit is put on the first parameter that is the value of a divisor in the scaling processing. When the divisor is within a predetermined range, the processing described above is performed further judging whether the weighting coefficient identified by the divisor is included in the predetermined range. On the other hand, when the divisor crosses the predetermined range, the scaling processing is performed with a predetermined value as the weighting coefficient. Therefore, when the pixel value in a current picture is determined, the calculation amount for calculating and the memory amount for storing the reciprocals of the devisors are limited to be small.

Furthermore, the moving picture prediction method according to claim 1 further comprising: a third judgment step of judging whether the second parameter is included in a predetermined range or not, wherein the second prediction step is executed when a result of the judgment in the third judgment step shows that the second parameter is not included in the predetermined range.

Hereby, a limit is put on the second parameter that is the value of a multiplier in the scaling processing. When the multiplier is within a predetermined range, the processing described above is performed further judging whether the weighting coefficient identified by the multiplier is included in the predetermined range or not. On the other hand, when the multiplier crosses the predetermined range, the scaling processing is performed with a predetermined value as the weighting coefficient. Therefore, when the pixel value in a current picture is determined, the calculation amount for calculating the reciprocals of the multipliers is limited to be small.

In addition, the present invention can be realized not only as the motion vector prediction method like this but also as a motion vector prediction apparatus using the steps included in the moving picture prediction method like this as means, moving picture coding method and apparatus as well as moving picture decoding method and apparatus, and a program for causing a computer to execute these steps. Then, the program like this, needless to say, can be distributed through a recoding medium such as a CD-ROM and a transmission medium such as Internet.

As is apparent from the above explanation, the moving vector prediction method according to the present invention makes the scaling processing using two reference pictures more efficient. Hereby, the calculation amount and the storage capacity accompanying the scaling processing are reduced.

In other words, the memory size of the look-up table and the like is reduced. The look-up table stores the number of the reciprocal calculations and the reciprocals required to avoid the divisions for calculating the weighting coefficients in generation of predictive pixel values and motion vectors. Furthermore, the scaling processing is performed with a predetermined significant bit number (16 bits, for example), enlargement of a circuit size is avoided.

BRIEF DESCRIPTION OF DRAWINGS

FIG. 7 is a flowchart showing significant processing steps of a size reduction of the look-up table required to avoid divisions to calculate the weighting coefficients.

FIG. 9 is a flowchart showing processing steps of performing the weighted prediction with a predetermined significant bit number.

BEST MODE FOR CARRYING OUT THE INVENTION

The moving picture prediction method according to the present embodiments of the present invention will be explained in detail below with reference to the figures.

The First Embodiment

Figure 5:
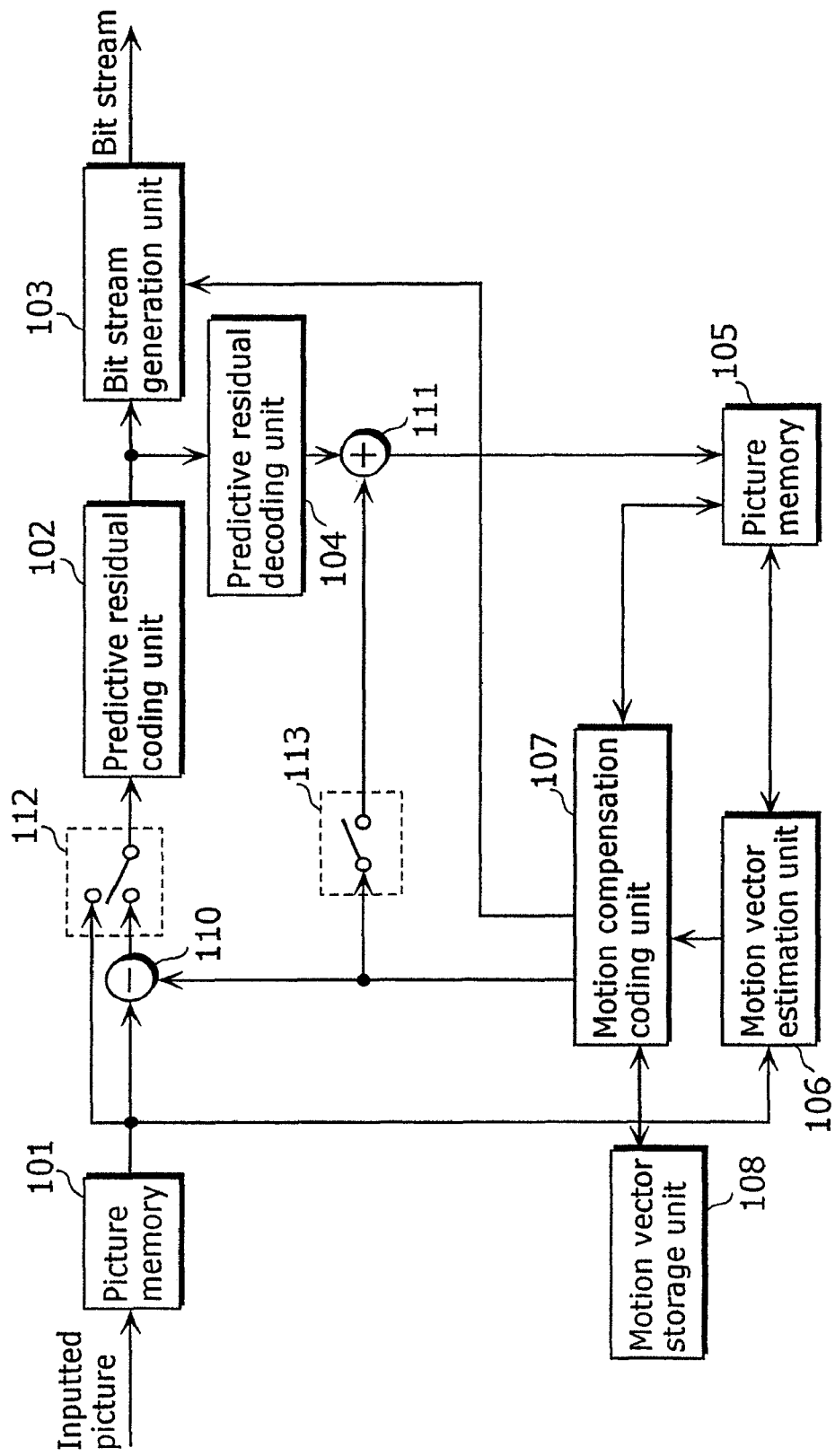
FIG. 5 is a block diagram showing the structure of the moving picture coding apparatus according to one embodiment using the moving picture prediction method according to the present invention.

FIG. 5 is a block diagram showing the structure of the moving picture coding apparatus according to one embodiment using the moving picture prediction method according to the present invention.

The moving picture coding apparatus includes picture memory 101, a predictive residual coding unit 102, a bit stream generation unit 103, a predictive residual decoding unit 104, picture memory 105, a motion vector estimation unit 106, a motion compensation coding unit 107, a motion vector storage unit 108, a difference calculation unit 110, an addition calculation unit 111, a switch 112 and a switch 113.

The picture memory 101 stores moving pictures inputted picture-by-picture basis in display order. The motion vector estimation unit 106 uses coded decoding picture data as a reference picture and performs estimation of a motion vector that shows the position predicted to be optimum in the research area in the picture.

The motion compensation coding unit 107 determines a coding mode of a block using a motion vector estimated by the motion vector estimation unit 106 and generates predictive picture data (predictive pixel values) based on this coding mode. For example, in the case of an inter picture predictive coding mode using two reference pictures, the motion compensation coding unit 107 obtains pixel values in two reference blocks from the two reference pictures using the motion vector estimated by the motion vector estimation unit 106 and generates predictive picture data. In other words, a weighted prediction of a pixel value is performed by characteristic scaling processing according to the present invention and the pixel value in the block to be processed form the pixel values in the two reference blocks. Furthermore, the motion compensation coding unit 107 has a look-up table that associates and stores the value corresponding to the distance between a first reference picture and a second reference picture (a value limited to a predetermined range), and its reciprocal. The motion compensation coding unit 107 performs the scaling processing with reference to this look-up table.

The motion vector storage unit 108 stores motion vectors estimated by the motion vector estimation unit 106. The motion vectors stored in this motion vector storage unit 108 are referred to, for example, in the case of a temporal direct mode that predicts a motion vector of a block to be processed by performing the scale processing to a motion vector that a reference picture has. The difference calculation unit 110 performs a calculation on the difference between picture data read out by the picture memory 101 and predictive picture data inputted from the motion compensation coding unit 107 and generates predictive residual picture data.

The predictive residual coding unit 102 performs coding processing such as frequency conversion and quantization to inputted predictive residual picture data and generates coded data. The bit stream generation unit 103 performs variable length coding and the like to inputted coded data and generates a bit stream by adding information on a motion vector and a coding mode inputted from the motion compensation coding unit 107.

The predictive residual decoding unit 104 performs decoding processing such as frequency inversion and inverse quantization to inputted coded data and generates decoded difference picture data. The addition calculation unit 111 adds decoded difference picture data inputted from the predictive residual decoding unit 104 and predictive picture data inputted from the motion compensation coding unit 107 together and generates decoded picture data. The picture memory 105 stores generated decoded picture data.

Next, a characteristic operation of the moving picture coding apparatus constructed as described above is explained. Here, generation of a predictive pixel value in a B picture by the motion compensation coding unit 107 or weighted prediction is explained as an example referring to FIGS. 2 and 3.

The motion compensation coding unit 107 calculates predictive pixel values in a block to be coded based on the following formula.

$$P = P0 + ((P1-P0) \times BWD) LWD \quad \text{Formula 5}$$

Here, BWD and LWD are values identified by the following Formulas 6 to 9.

$$BWD0 = ((T-T0) << 7)/(T1-T0) \quad \text{Formula 6}$$

Here, "<<" means a bit sift to the left direction. In other words, "<<7" means "×(2 to the 7th power).

$$LWD0 = \text{Ceil}(\log 2(1+(\text{abs}(BWD0) >> 7))) \quad \text{Formula 7}$$

Here, the function Ceil (x) is a function that rounds x to the integer that is x or more and closest to x. The function abs (x) is a function that returns the absolute value of x.

$$BWD = BWD0 >> DWD0 \qquad \text{Formula 8}$$

$$LWD = 7 - LWD0 \qquad \text{Formula 9}$$

By the way, as is shown in Formula 7, LWD0 also means the number of bits of the integral value of abs (BWD0)>>7.

As is apparent from the above-mentioned formulas, in the present embodiment, when a pixel value can be expressed by 8 bits, above-mentioned Formulas 6 to 9 are all 16-bit calculations. Therefore, it is guaranteed that the scaling processing shown in above-mentioned Formula 5 is performed within the range of the significant bit number of 16 bits. In other words, weighting coefficients are limited by above-mentioned Formula 8 so that the multiplications of above-mentioned Formula 5 do not cross the significant bit value of 16 bits. Hereby, weighted prediction of a B picture is always realized within the significant bit number of 16 bits. In addition, it is acceptable to calculate BWD and LWD in advance and store them in a look-up table at the starting time point of a picture or a slice to reduce processing amount.

Note that it is possible to apply another limitation besides the above limitation in the present embodiment to reduce the number of calculations to obtain weighting coefficients. The other limitation is that when the reference picture of the block 1 is not the first picture in a second reference list (list 1), a default weight coefficient is used. Here, the first reference picture in the second reference list is the reference picture to which an index 0 is added in the second reference list.

Here, a reference list is a row of relative numbers (indices) to identify reference pictures and a first reference list and a second reference list are used to identify two pictures to which a B picture refers. The first reference list is a reference list for the first motion vector and is usually used for forward prediction; the second reference list is a reference list for the second motion vector and is usually used for backward prediction. An index with a small number is usually allocated to a reference picture that has large pixel correlation with a picture to be coded and the smallest number is 0. Additionally, the default values of the weighting coefficients are preferably BWD=1 and LWD=1. But it is acceptable that when the value of LWD0 is larger than 7, different default values, for example, BWD=1 and LWD=0 are configured.

Figure 6:
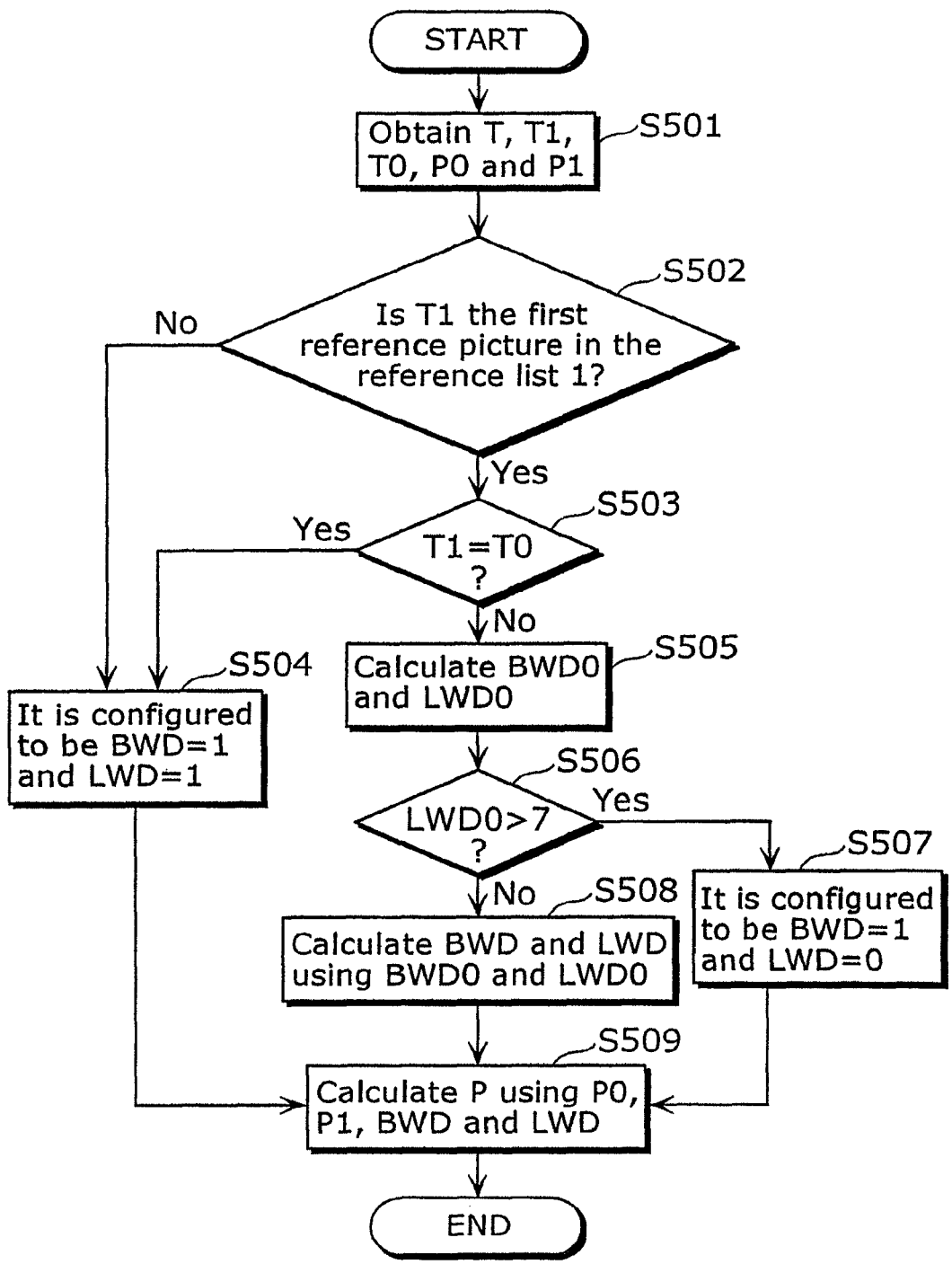
FIG. 6 is a flowchart showing processing steps of a weighted prediction by the motion compensation coding unit in FIG. 5.

FIG. 6 is a flowchart showing processing steps of the weighted prediction by the motion compensation coding unit 107. First, when P0, P1, T, T0 and T1 are obtained (Step S501), whether the reference picture to which block 2 belongs is the first reference picture in the second reference list (or the index 0 in the list 1) or not is judged (Step S502).

As a result, when the reference picture to which the block 2 belongs is not the first reference picture in the second reference list (Step S502; No), the weighting coefficient is configured to be a first default value (Step S504). Here, "the weighting coefficient is configured to be a first default value" means that BWD=1 and LWD=1.

On the other hand, when the reference picture to which the block 2 belongs is the first reference picture in the reference list (Step S502; Yes), whether Time T1 and Time T2 are equal or not is judged (Step S503). As a result, when Time T1 and Time T0 are equal (Step S503; Yes), the weighting coefficient is configured to be a first default value (Step S504); when Time T1 and Time T0 are not equal (Step S503; No), BWD0 and LWD0 are calculated according to above-mentioned Formulas 6 and 7 (Step S505).

Subsequently, whether LDW0 is larger than 7 or not is judged (Step S506). When it is larger than 7 (Step S506; Yes), the weighting coefficient is configured to be a second default value (Step S507). Here, "the weighting coefficient is configured to be a second default value" means that BWD=1 and LWD=0. On the other hand, when LWD0 is 7 or less (Step S506; No), BWD and LWD are calculated according to above-mentioned Formulas 8 and 9 (Step S508).

Then, using BWD and LWD determined as described above, the predictive pixel value P in the block to be coded is calculated according to above-mentioned Formula 5 (Step S509).

In this way, when the above limitations (Steps S502, S503, S504, S506 and S507) or certain conditions are met, fixing the weighting coefficient to a predetermined value makes the number of calculations and required memory size of the look-up table for the weighting coefficients extremely smaller than was previously possible. Moreover, the required number of divisions equals to the value that subtracts one from the number of the weighting coefficients stored in the look-up table. This is because the weighting coefficients of default values are used in the remaining part at the entry of the look-up table. In other words, only part of the weighting coefficients is determined by the calculation.

By the way, the weighted prediction described above, needless to say, holds true not only when a pixel value indicates luminance but also when the pixel value indicates chrominance. For example, as for weighting coefficients on chrominance of blocks in a B picture, predictive values of the chrominance can be calculated by applying the offset of 128 to Formula 5 similarly to Formula 3. Consequently, the calculation amount of scaling to pixel values of the chrominance is also reduced compared with conventional scaling.

As is described above, the moving picture coding apparatus according to the present embodiment makes the scaling processing using two reference blocks more efficient. The effect to reduce the calculation amount can be applied, needless to say, not only to the moving picture coding apparatus but also to a moving picture decoding apparatus.

In addition, in the present embodiment, a method for realizing both of a size reduction of the look-up table required to avoid divisions to calculate the weighting coefficients and performing the weighted prediction with a predetermined significant bit number (16 bits, for example) at the same time is shown, but the present invention is not necessarily limited to the method for realizing both of the effects at the same time. Hereafter, the methods for realizing each of the size reduction of the look-up table and the weighted prediction with a predetermined significant bit number individually are explained.

Furthermore, in the above description, the method for performing the weighted prediction with the predetermined significant bit number by the bit sifts is shown, but it is possible to use fixed values for BWD and LWD. Using the fixed values for BWD and LWD, the weighting coefficients may cross the significant bit number. In this instance, predetermined weighting coefficients are used as explained below.

FIG. 7 is a flowchart showing significant processing steps of a size reduction of the look-up table required to avoid divisions to calculate the weighting coefficients.

Figure 1:
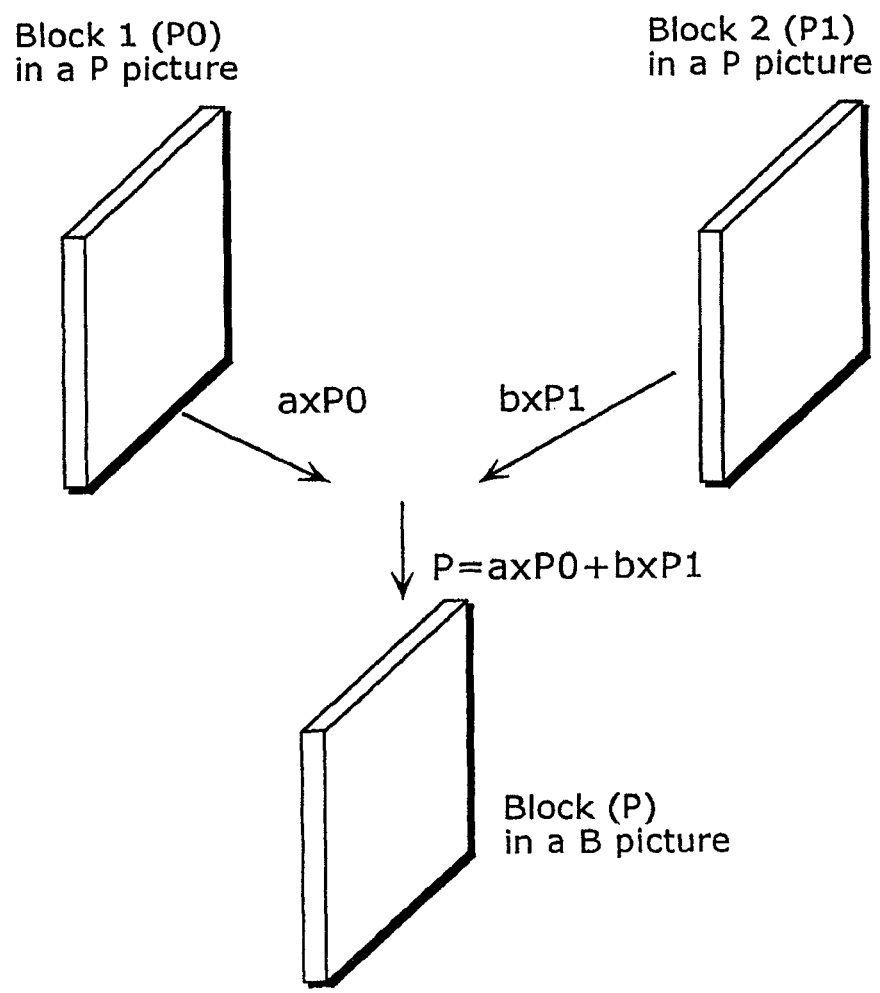
FIG. 1 is a diagram showing an example of prior art indicating a process for calculating predictive pixel values in a B picture with the weighted prediction based on two reference pictures.
Figure 2:
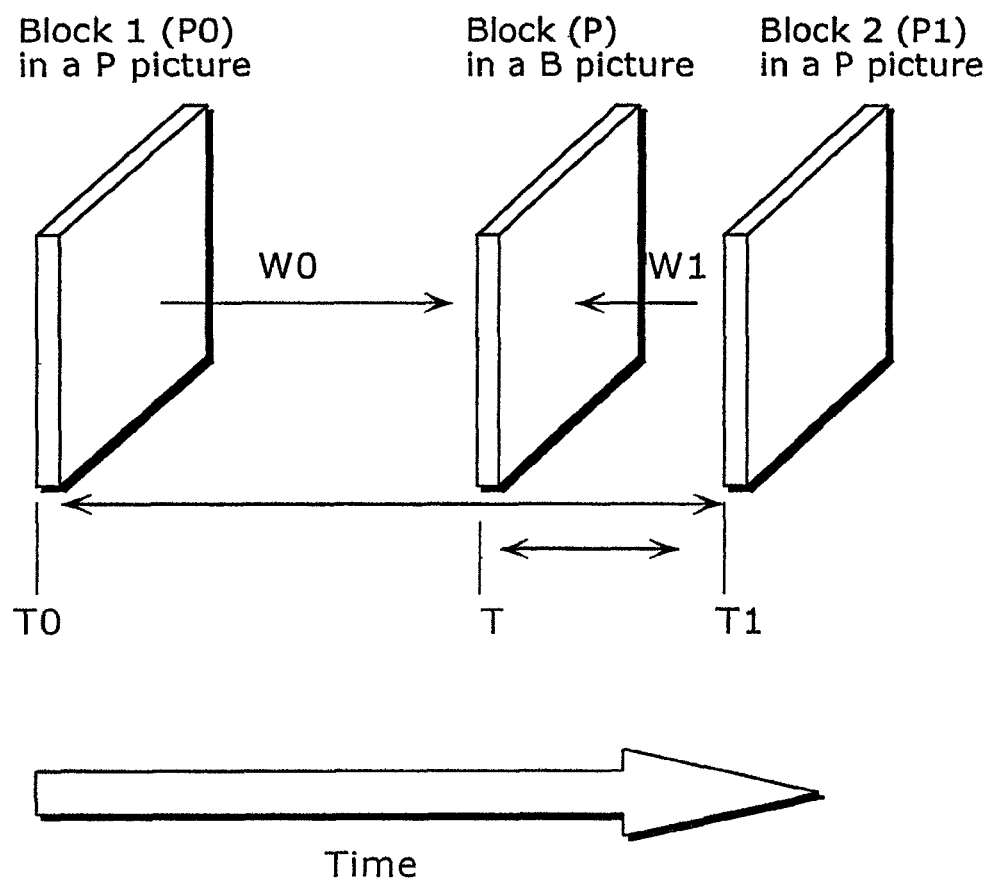
FIG. 2 is a diagram showing an example when a B picture (a block to be coded) refers to a forward picture (block 1) and a backward picture (block 2).
Figure 3:
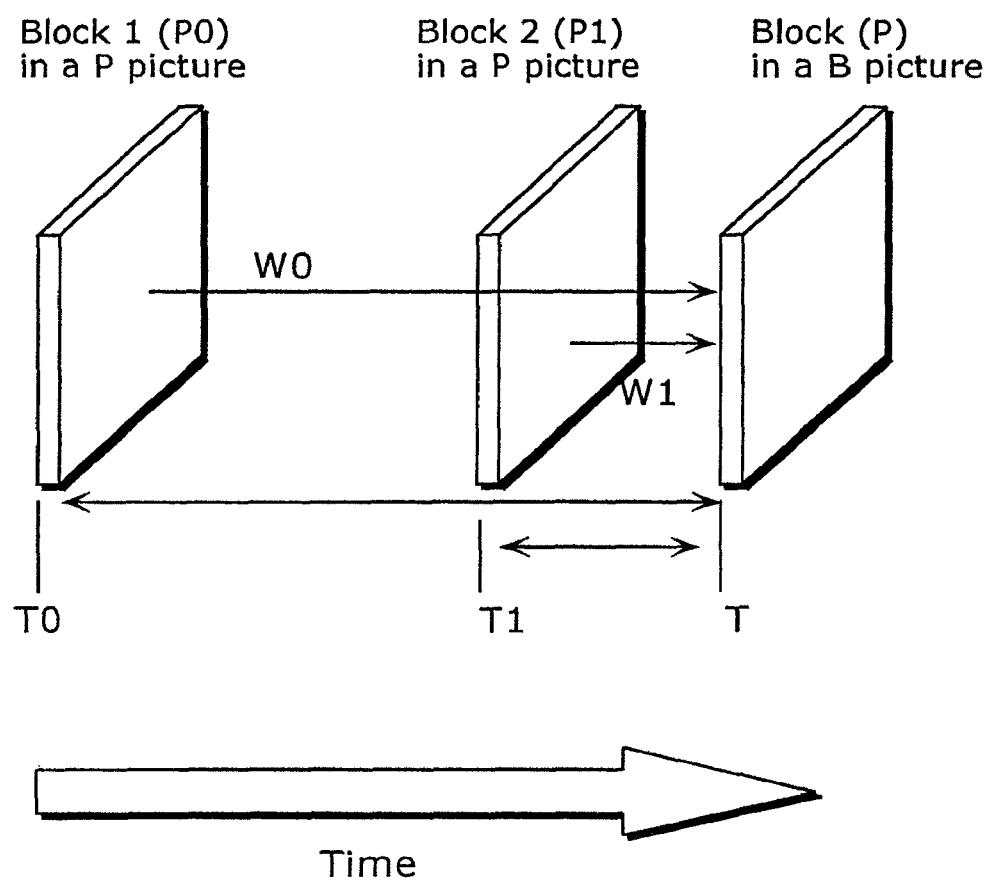
FIG. 3 is a diagram showing an example when a B picture (a block to be coded) refers to two forward pictures (blocks 1and 2).
Figure 4:
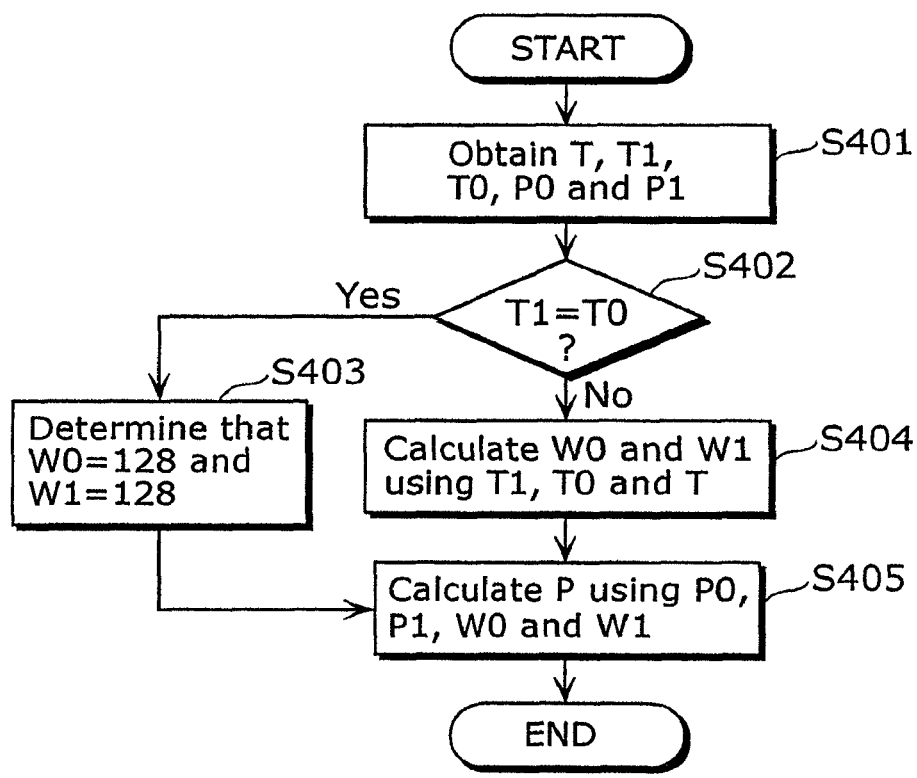
FIG. 4 is a flowchart showing the steps of a conventional weighted prediction.

First, the motion compensation coding unit 107 judges whether generation of predictive values corresponding to the values of Time T, T1 and T0 is necessary or not on the occasion of the weighted prediction of a B picture shown in FIGS. 2 and 3 (Step S70). As a result, when the motion compensation coding unit 107 judges the generation to be necessary (Step S70; Yes), it generates the predictive values corresponding to the values of Time T, T1 and T0 as usual according to above-mentioned Formulas 1 to 3 (Step S72). On the other hand, when the motion compensation coding unit 107 judges the generation to be unnecessary (Step S70; No), it configures each of two weighting coefficients W0 and W1 to be ½ and generates the predictive values according to above-mentioned Formula 3 (Step S71).

Figure 8A:
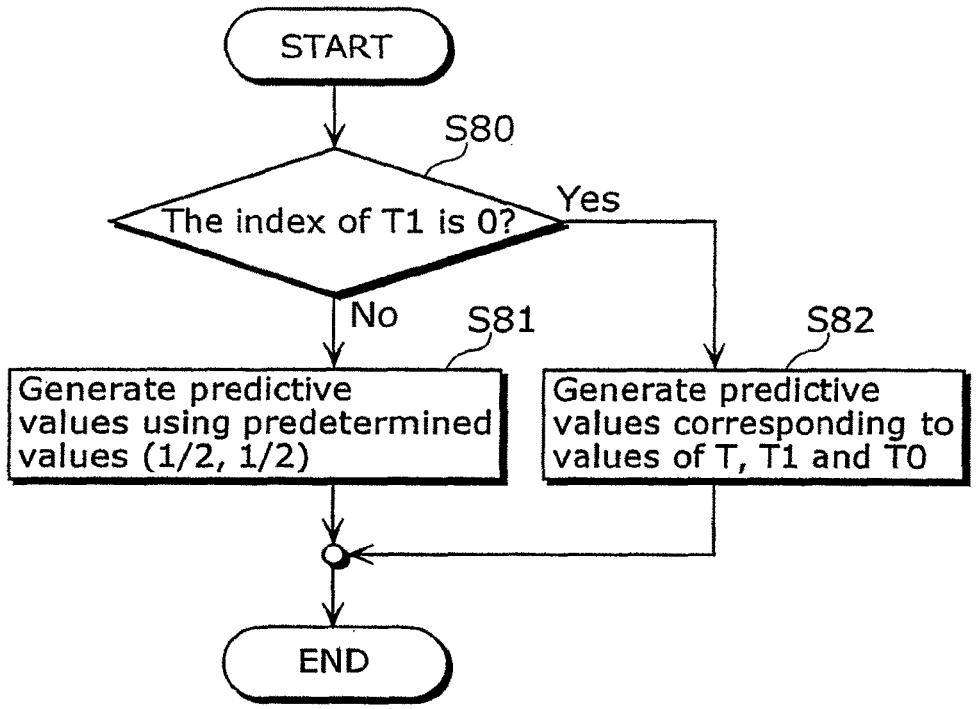
FIGS. 8A and 8B are flowcharts showing concrete examples of the judgment processing (Step S70) in FIG. 7.
Figure 8B:
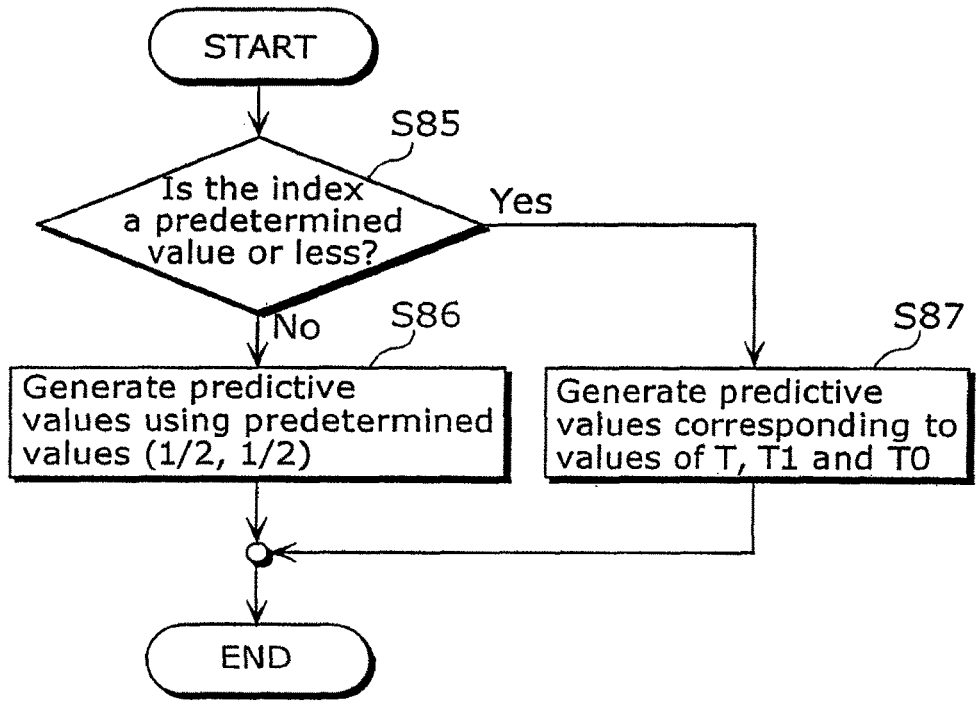

FIGS. 8A and 8B are flowcharts showing concrete examples of the judgment processing (Step S70) in FIG. 7.

In FIG. 8A, according to whether the index of Time T1 (the index of the reference picture corresponding to Time T in the reference lists) is 0 or not (Step S80), the motion compensation coding unit 107 switches between generation of the predictive value using predetermined weighting coefficients (W0=W1=½, for example) (Step S81) and generation of the predictive value using Time T, T1, and T0 according to above-mentioned Formulas 1 to 3 (Step S82). Hereby, for example, since calculation of the weighting coefficients depending on time relationship is necessary only when the index of Time T1 is 0 is necessary, storing the weighting coefficients corresponding to such cases only in the look-up table reduces the table size compared with storing the weighting coefficients for all the occasions conventionally.

In FIG. 8B, according to whether the index of Time T1 (the index of the reference picture corresponding to Time T in the reference lists) is a predetermined value (2, for example) or less (Step S85), the motion compensation coding unit 107 switches between generation of the predictive value using predetermined weighting coefficients (W0=W1=½, for example) (Step S86) and generation of the predictive value using Time T, T1 and T0 according to above-mentioned Formulas 1 to 3 (Step S87). Hereby, for example, since the calculation of the weighting coefficients depending on time relationship is necessary only when the index of a reference picture is the predetermined value or less, storing only the weighting coefficients corresponding to such cases in the look-up table reduces the table size compared with storing the weighting coefficients for all the occasions conventionally.

FIG. 9 is a flowchart showing processing steps of performing the weighted prediction with a predetermined significant bit number.

First, the motion compensation coding unit 107 judges whether generation of predictive values corresponding to the values of Time T, T1 and T0 with a predetermined significant bit number is possible or not on the occasion of the weighted prediction of a B picture shown in FIGS. 2 and 3 (Step S90).

As a result, when the motion compensation coding unit 107 judges the generation to be possible (Step S90; Yes), it generates the predictive values corresponding to the values of Time T, T1 and T0 as usual according to above-mentioned Formulas 1 to 3 (Step S92). On the other hand, when the motion compensation coding unit 107 judges the generation to be impossible (Step S90; No), it configures each of two weighting coefficients W0 and W1 to be ½ and generates the predictive values according to above-mentioned Formula 3 (Step S91).

Figure 10A:
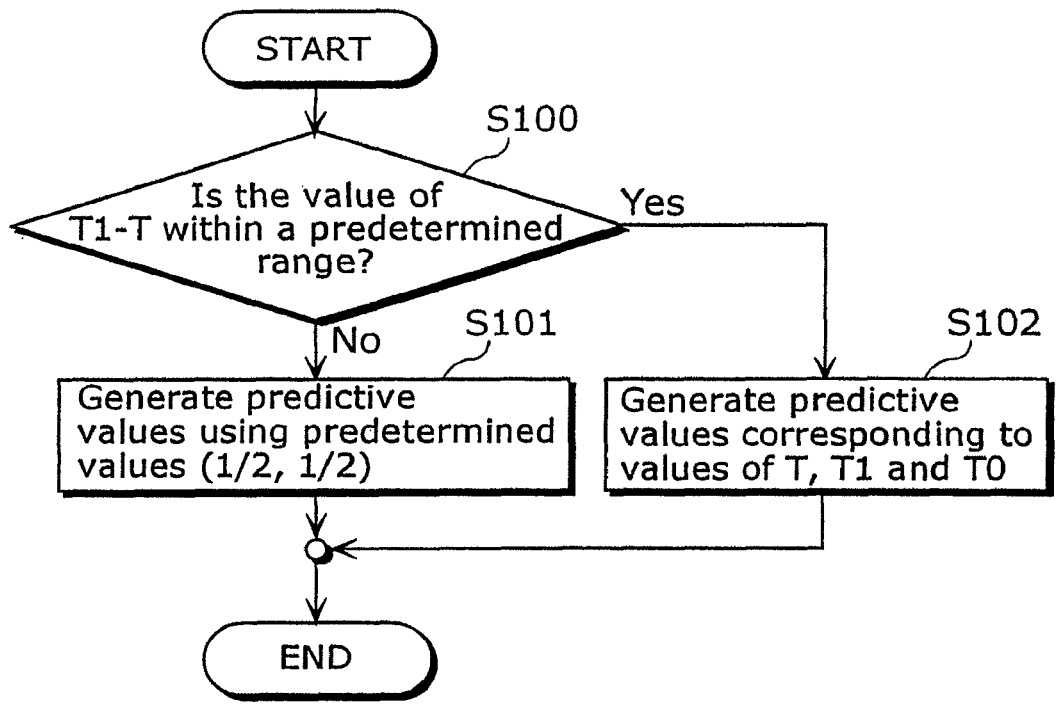
FIGS. 10A and 10B are flowcharts showing concrete examples of the judgment processing (Step S90) in FIG. 9.
Figure 10B:
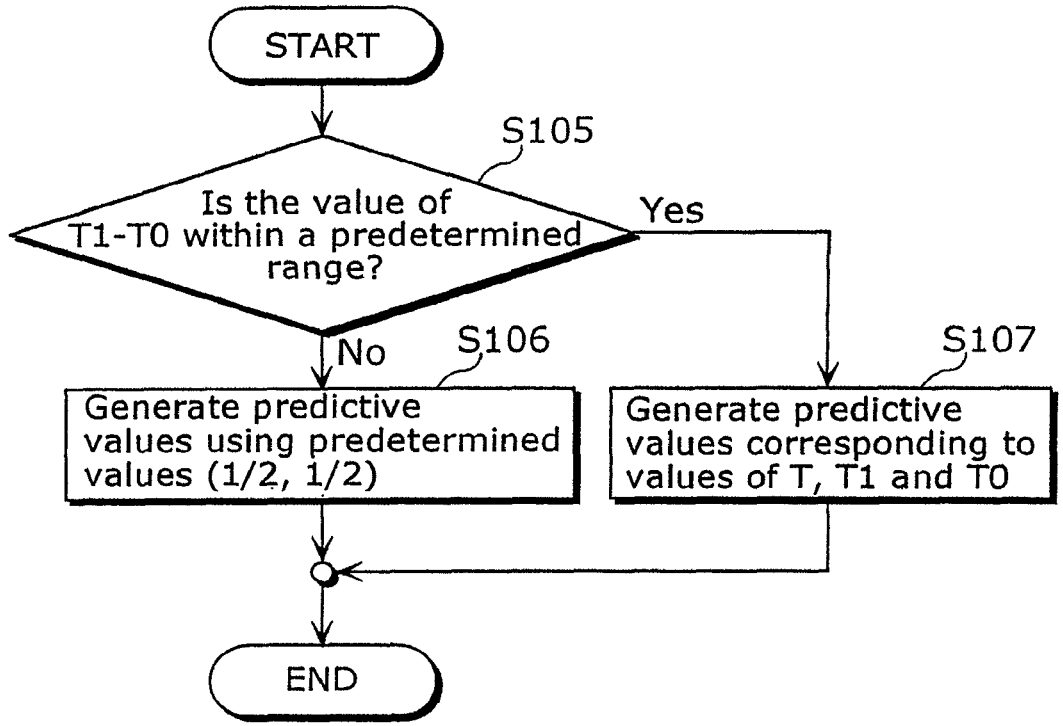

FIGS. 10A and 10B are flowcharts showing concrete examples of the judgment processing (Step S90) in FIG. 9.

FIG. 10A is a diagram showing a concrete example of the weighted prediction of a pixel value. Here, according to whether the difference between Time T1 and Time T (T1−T) is within a predetermined range (−2~2, for example) or not (Step S100), the motion compensation coding unit 107 switches between generation of the predictive value using predetermined weighting coefficients (W0=W1=½, for example) (Step S101) and generation of the predictive value using Time T, T1, and T0 according to above-mentioned Formulas 1 to 3 (Step S102). Hereby, in generation of a predictive pixel value, when the weighting coefficients cross a predetermined value, in other words, when it may transpire that the weighting coefficients cannot be expressed by a predetermined bit number, the weighting coefficients are configured to be predetermined values (values expressed by the predetermined bit number), therefore the weighted prediction with a predetermined significant bit number is always ensured.

FIG. 10B is a diagram showing a concrete example of the weighted prediction of a pixel value. Here, according to whether the difference between Time T1 and Time T0 (T1−T0) is within a predetermined range (−2~2, for example) or not (Step S105), the motion compensation coding unit 107 switches between generation of the predictive value using predetermined weighting coefficients (W0=W1=½, for example) (Step S106) and generation of the predictive value using Time T, T1, and T0 according to above-mentioned Formulas 1 to 3 (Step S107). Hereby, in generation of a predictive pixel value, when the weighting coefficients cross a predetermined value, in other words, when it may transpire that the weighting coefficients cannot be expressed by a predetermined bit number, the weighting coefficients are configured to be predetermined values (values expressed by the predetermined bit number), therefore the weighted prediction with a predetermined significant bit number is always ensured.

The Second Embodiment

Next, the moving picture decoding apparatus using the moving picture prediction method according to the present invention is explained.

Figure 11:
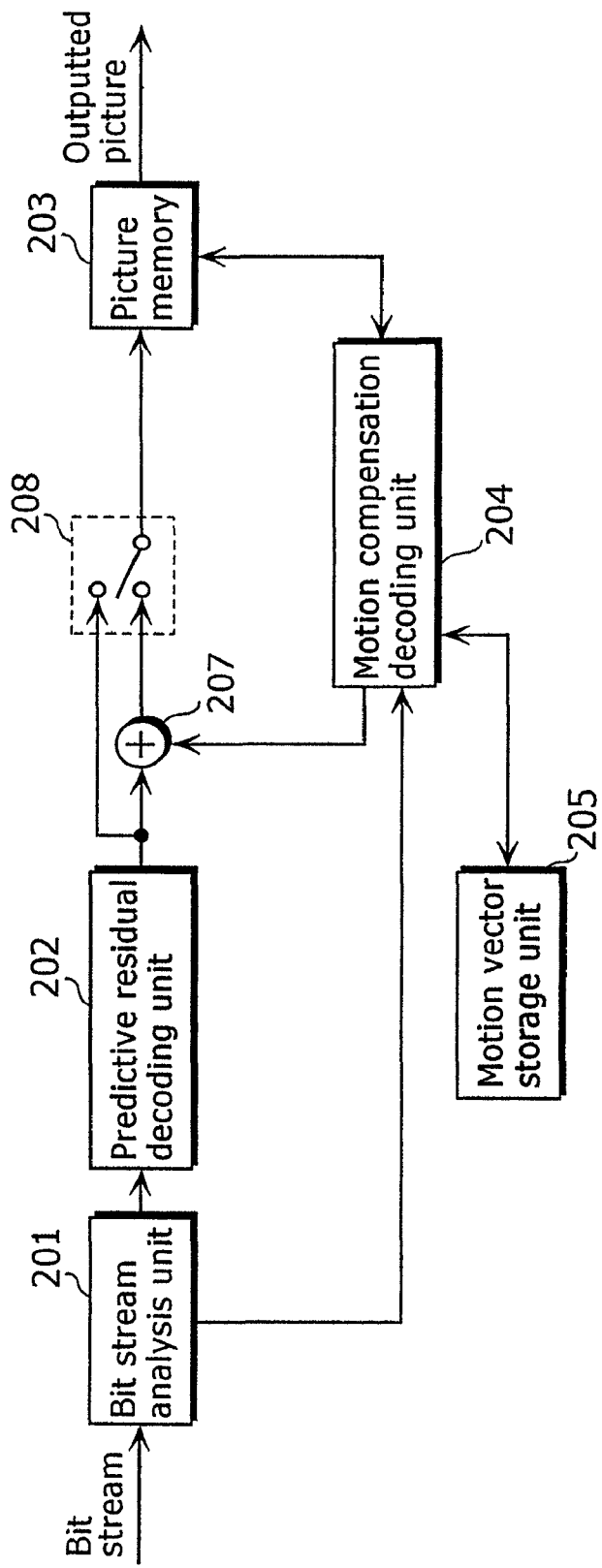
FIG. 11 is a block diagram showing the structure of the moving picture decoding apparatus according to one embodiment using the moving picture prediction method according to the present invention.

FIG. 11 is a block diagram showing the structure of the moving picture decoding apparatus according to one embodiment using the moving picture prediction method according to the present invention.

The moving picture decoding apparatus includes a bit stream analysis unit 201, a predictive residual decoding unit 202, picture memory 203, a motion compensation decoding unit 204, a motion vector storing unit 205, an addition calculation unit 207 and a switch 208.

The bit stream analysis unit 201 extracts various data such as coding mode information and motion vector information used at the time of coding from an inputted bit stream. The predictive residual decoding unit 202 performs decoding to inputted predictive residual coding data and generates predictive residual picture data.

The motion compensation decoding unit 204 generates motion compensation picture data based on coding mode information and motion vector information at the time of coding. When a block to be decoded is coded in a inter picture prediction coding mode using two reference pictures, for example, the motion compensation decoding unit 204 obtains pixel values in two reference blocks from two reference pictures using a motion vector extracted by the bit stream analysis unit 201. In other words, the motion compensation decoding unit 204 performs the weighted prediction of the pixel values with the characteristic scaling processing according to the present invention and obtains the pixel value in a block to be processed form the pixel values in the two reference blocks. Additionally, the motion compensation decoding unit 204 has the look-up table that associates and stores the value corresponding to the distance between a first reference picture and a second reference picture and its reciprocal. The motion compensation decoding unit 204 performs the scaling processing with reference to this look-up table.

The motion vector storing unit 205 stores motion vectors extracted by the bit stream analysis unit 201. The motion vectors stored in the motion vector storing unit 205 are referred to, for example, when a block to be decoded is coded in a temporal direct mode. The addition calculation unit 207 adds predictive residual coding data inputted from the predictive residual decoding unit 202 and motion compensation picture data inputted from the motion compensation decoding unit 204, and generates decoded picture data. The picture memory 203 stores the generated decoded picture data.

A characteristic operation of the moving picture decoding apparatus constructed as described above, in other words, the weighted prediction by the motion compensation decoding unit 204 is explained.

The motion compensation decoding unit 204 has basically the similar functions to the motion compensation coding unit 107 included in the motion picture coding apparatus. For example, in the weighted prediction of a pixel value by the scaling processing, as is shown in FIG. 6, based on the index value of Time T1 and the conformity between Time T1 and Time T0 (Steps S501~S503), the motion compensation decoding unit 204 configures default values to BWD and LWD (Steps S504, S507), identifies BWD and LWD based on above-mentioned Formulas 6 to 9 (Step S508) and calculates the predictive value in the block to be coded P using identified BWD and LWD based on above-mentioned Formula 5 (Step S509).

By the way, it is acceptable that the motion compensation decoding unit 204 performs only significant processing for the size reduction of the look-up table required to avoid divisions in the calculation of the weighting coefficients as shown in FIGS. 7 and 8. In other words, the motion compensation decoding unit 204 judges whether generation of predictive values corresponding to the values of Time T, T1 and T0 is necessary or not on the occasion of the weighted prediction of a B picture shown in FIG. 2 or FIG. 3 (Step S70). As a result, when the motion compensation decoding unit 204 judges the generation to be necessary (Step S70; Yes), it generates the predictive values corresponding to the values of Time T, T1 and T0 as usual according to above-mentioned Formulas 1 to 3 (Step S72). On the other hand, when the motion compensation decoding unit 204 judges the generation to be unnecessary (Step S70; No), it configures each of two weighting coefficients W0 and W1 to be ½ and generates the predictive values according to above-mentioned Formula 3 (Step S71).

Hereby, since the calculation of the weighting coefficients depending on time relationship is necessary only when generation of predictive values corresponding to Time T, T1 and T0 is necessary, storing the weighting coefficients corresponding to such cases only in the look-up table reduces the table size compared with storing the weighting coefficients for all the occasions conventionally.

Similarly, it is acceptable that the motion compensation decoding unit 204 performs processing for the weighted prediction with a predetermined significant bit number as shown in FIGS. 9 and 10. In other words, the motion compensation decoding unit 204 judges whether generation of predictive values corresponding to the values of Time T, T1 and T0 is possible or not on the occasion of the weighted prediction of a B picture shown in FIGS. 2 and 3 (Step S90). As a result, when the motion compensation decoding unit 204 judges the generation to be possible (Step S90; Yes), it generates the predictive values corresponding to the values of Time T, T1 and T0 as usual according to above-mentioned Formulas 1 to 3 (Step S92). On the other hand, when the motion compensation decoding unit 204 judges the generation to be impossible (Step S90; No), it configures each of two weighting coefficients W0 and W1 to be ½ and generates the predictive values according to above-mentioned Formula 3 (Step S91).

Hereby, when the weighted prediction cannot be performed with the predetermined significant bit number using Time T, T1 and T0, in other words, when it transpires that the weighting coefficients cross a predetermined value and therefore cannot be expressed by the predetermined bit number, the weighting coefficients are configured to be predetermined values (values expressed by the predetermined bit number), therefore the weighted prediction with the predetermined significant bit number is always ensured.

The Third Embodiment

Next, an example of realizing the moving picture prediction method, the moving picture coding apparatus and the moving picture decoding apparatus according to the present invention in another embodiment is explained.

It is possible to easily perform the processing shown in the above embodiments in an independent computing system by recording a program for realizing the structure of the picture coding apparatus or the picture decoding apparatus shown in the above-mentioned embodiments onto the storage medium such as a flexible disk.

FIG. 12 is an illustration for realizing the moving picture prediction method, the moving picture coding/decoding method using a flexible disk that stores a program for realizing the structure of the moving picture coding apparatus or the moving picture decoding apparatus.

Figure 12A:
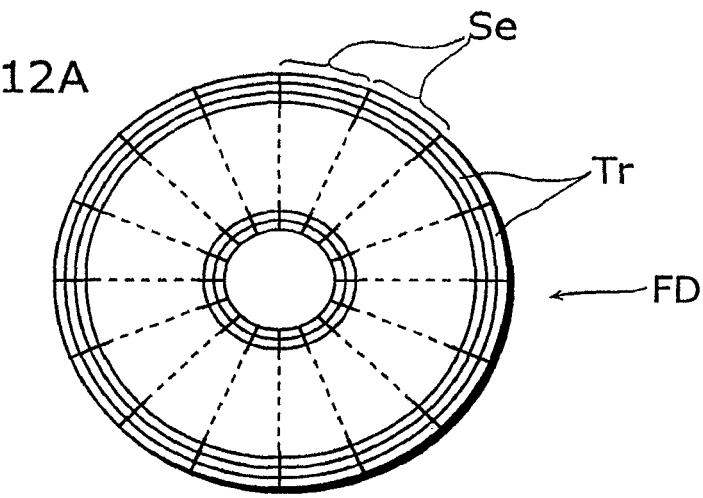
FIGS. 12A, 12B and 12C are illustrations for realizing the moving picture prediction method, the moving picture coding/decoding method using a flexible disk that stores a program for realizing the structure of the moving picture coding apparatus or the moving picture decoding apparatus.
Figure 12B:
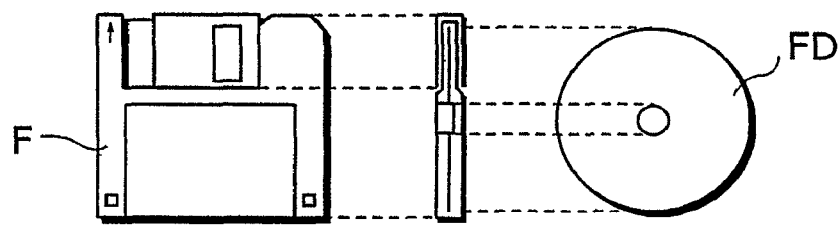

FIG. 12B shows a full appearance of a flexible disk, its structure at cross section and the flexible disk itself whereas FIG. 12A shows an example of a physical format of the flexible disk as a main body of a storing medium. A flexible disk FD is contained in a case F, a plurality of tracks Tr are formed concentrically from the periphery to the inside on the surface of the disk, and each track is divided into 16 sectors Se in the angular direction. Therefore, as for the flexible disk storing the above-mentioned program, data as the above-mentioned program is stored in an area assigned for it on the flexible disk FD.

Figure 12C:
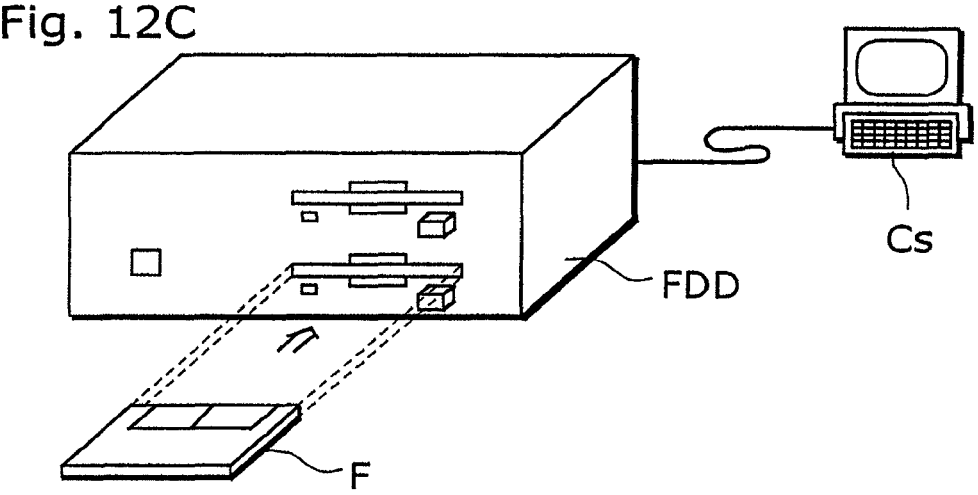

FIG. 12C shows a structure for recording and reading out the program on the flexible disk FD. When the program is recorded on the flexible disk FD, the computing system Cs writes in data as the program via a flexible disk drive. When the moving picture coding apparatus or the moving picture decoding apparatus is constructed in the computing system by the program on the flexible disk, the program is read out from the flexible disk drive and then transferred to the computing system Cs.

The above explanation is made on an assumption that a storing medium is a flexible disk, but the same processing can also be performed using an optical disk. In addition, the storing medium is not limited to a flexible disk and an optical disk, but any other medium such as an IC card and a ROM cassette capable of recording a program can be used.

The following is an explanation of the applications of the moving picture prediction method, the moving picture coding apparatus and the moving picture decoding apparatus as shown in the above-mentioned embodiments, and a system using them.

Figure 13:
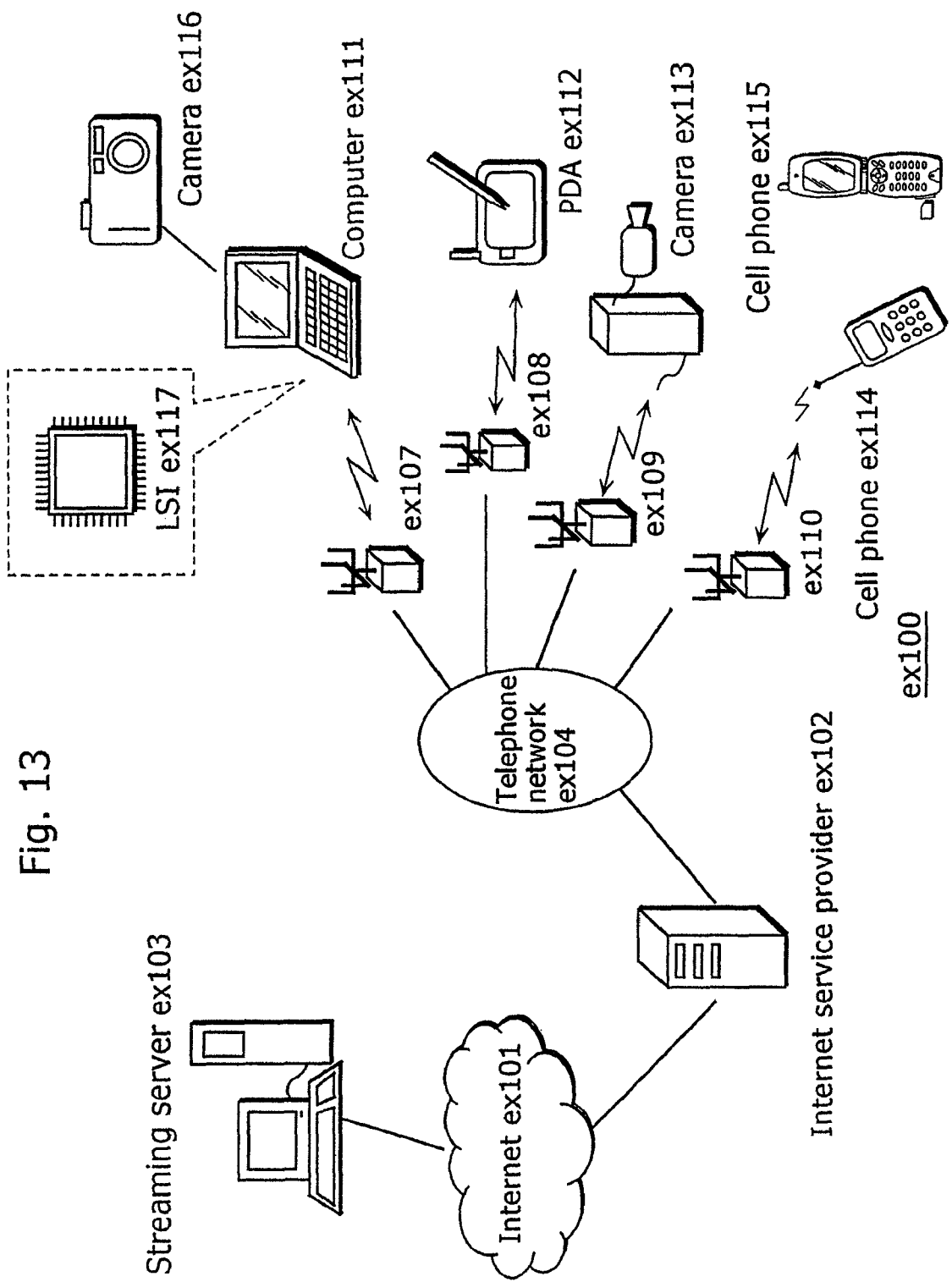
FIG. 13 is a block diagram showing an overall configuration of a content supply system for realizing content distribution service.

FIG. 13 is a block diagram showing an overall configuration of a content supply system ex100 for realizing content distribution service. The area for providing communication service is divided into cells of desired size, and cell sites ex107 to ex110 which are fixed wireless stations are placed in respective cells.

This content supply system ex100 is connected to devices such as Internet ex101, an Internet service provider ex102, a telephone network ex104, as well as a computer ex111, a PDA (Personal Digital Assistant) ex112, a camera ex113, a cell phone ex114 and a cell phone with a camera ex115 via the cell sites ex107 to ex110.

However, the content supply system ex100 is not limited to the configuration as shown in FIG. 13 and may be connected to a combination of any of them. Also, each device may be connected directly to the telephone network ex104, not through the cell sites ex107 to ex110.

The camera ex113 is a device capable of shooting video such as a digital video camera. The cell phone ex114 may be a cell phone of any of the following system: a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 via the telephone network ex104 and also the cell site ex109, which realizes a live distribution or the like using the camera ex113 based on the coded data transmitted from the user. Either the camera ex113 or the server which transmits the data may code the data. Also, the picture data shot by a camera ex116 may be transmitted to the streaming server ex103 via the computer ex111. In this case, either the camera ex116 or the computer ex111 may code the picture data. An LSI ex117 included in the computer ex111 or the camera ex116 actually performs coding processing. Software for coding and decoding moving pictures may be integrated into any type of storage medium (such as a CD-ROM, a flexible disk and a hard disk) that is a recording medium which is readable by the computer ex111 or the like. Furthermore, a cell phone with a camera ex115 may transmit the picture data. This picture data is the data coded by the LSI included in the cell phone ex115.

The content supply system ex100 codes contents (such as a music live video) shot by a user using the camera ex113, the camera ex116 or the like in the same way as shown in the above-mentioned embodiments and transmits them to the streaming server ex103, while the streaming server ex103 makes stream distribution of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

When each device in this system performs coding or decoding, the moving picture coding apparatus or the moving picture decoding apparatus shown in the above-mentioned embodiments can be used.

A cell phone will be explained as an example of the device.

Figure 14:
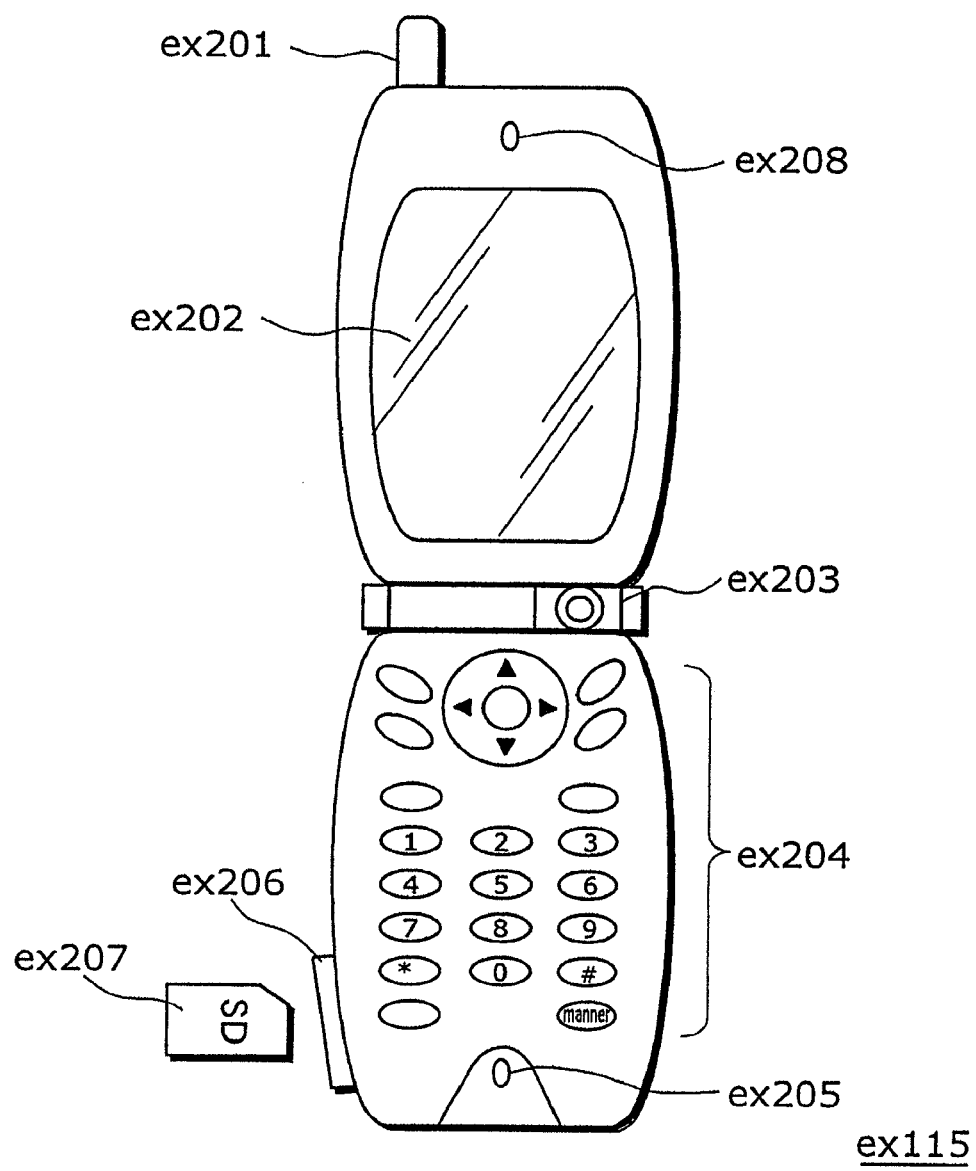
FIG. 14 is a diagram showing the cell phone using the moving picture prediction method, the moving picture coding apparatus and the moving picture decoding apparatus according to the present invention.

FIG. 14 is a diagram showing the cell phone ex115 using the moving picture prediction method, the moving picture coding apparatus and the moving picture decoding apparatus explained in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, an audio output unit ex208 such as a speaker for outputting audio, an audio input unit ex205 such as a microphone for inputting audio, a storage medium ex207 for storing coded or decoded data such as data of moving or still pictures shot by the camera, data of received e-mails and that of moving or still pictures, and a slot unit ex206 for attaching the storage medium ex207 to the cell phone ex115. The storage medium ex207 stores in itself a flash memory element, a kind of EEPROM (Electrically Erasable and Programmable Read Only Memory) that is a nonvolatile memory electrically erasable from and rewritable to a plastic case such as an SD card.

Next, the cell phone ex115 will be explained with reference to FIG. 15. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a read/write unit ex307, a modem circuit unit ex306 and a audio processing unit ex305 via a synchronous bus ex313.

When a call-end key or a power key is turned ON by a user's operation, the power supply circuit unit ex310 supplies respective units with power from a battery pack so as to activate the camera attached digital cell phone ex115 as a ready state.

In the cell phone ex115, the audio processing unit ex305 converts the audio signals received by the audio input unit ex205 in conversation mode into digital audio data under the control of the main control unit ex311 including a CPU, ROM and RAM, the modem circuit unit ex306 performs spread spectrum processing of the digital audio data, and the communication circuit unit ex301 performs digital-to-analog conversion and frequency conversion of the data, so as to transmit it via the antenna ex201. Also, in the cell phone ex115, the communication circuit unit ex301 amplifies the data received by the antenna ex201 in conversation mode and performs frequency conversion and analog-to-digital conversion to the data, the modem circuit unit ex306 performs inverse spread spectrum processing of the data, and the audio processing unit ex305 converts it into analog audio data, so as to output it via the audio output unit ex208.

Further, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency conversion for the text data, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the moving picture coding apparatus as explained in the present invention, compresses and codes the picture data supplied from the camera unit ex203 by the coding method used for the moving picture coding apparatus as shown in the above-mentioned embodiment so as to transform it into coded picture data, and sends it out to the multiplexing/demultiplexing unit ex308. At this time, the cell phone ex115 sends out the audio received by the audio input unit ex205 during the shooting with the camera unit ex203 to the multiplexing/demultiplexing unit ex308 as digital audio data via the audio processing unit ex305.

The multiplexing/demultiplexing unit ex308 multiplexes the coded picture data supplied from the picture coding unit ex312 and the audio data supplied from the audio processing unit ex305 using a predetermined method, then the modem circuit unit ex306 performs spread spectrum processing of the multiplexed data obtained as a result of the multiplexing, and lastly the communication circuit unit ex301 performs digital-to-analog conversion and frequency conversion of the data for the transmission via the antenna ex201.

As for receiving data of a moving picture file that is linked to a Web page or the like in data communication mode, the modem circuit unit ex306 performs inverse spread spectrum processing of the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 separates the multiplexed data into a bit stream of picture data and that of audio data, and supplies the coded picture data to the picture decoding unit ex309 and the audio data to the audio processing unit ex305 respectively via the synchronous bus ex313.

Next, the picture decoding unit ex309, including the moving picture decoding apparatus as explained in the above-mentioned invention, decodes the bit stream of picture data using the decoding method corresponding to the coding method as shown in the above-mentioned embodiments to generate reproduced moving picture data, and supplies this data to the display unit ex202 via the LCD control unit ex302, and thus the picture data included in the moving picture file linked to a Web page, for instance, is displayed. At the same time, the audio processing unit ex305 converts the audio data into analog audio data, and supplies this data to the audio output unit ex208, and thus the audio data included in the moving picture file linked to a Web page, for instance, is reproduced.

Figure 16:
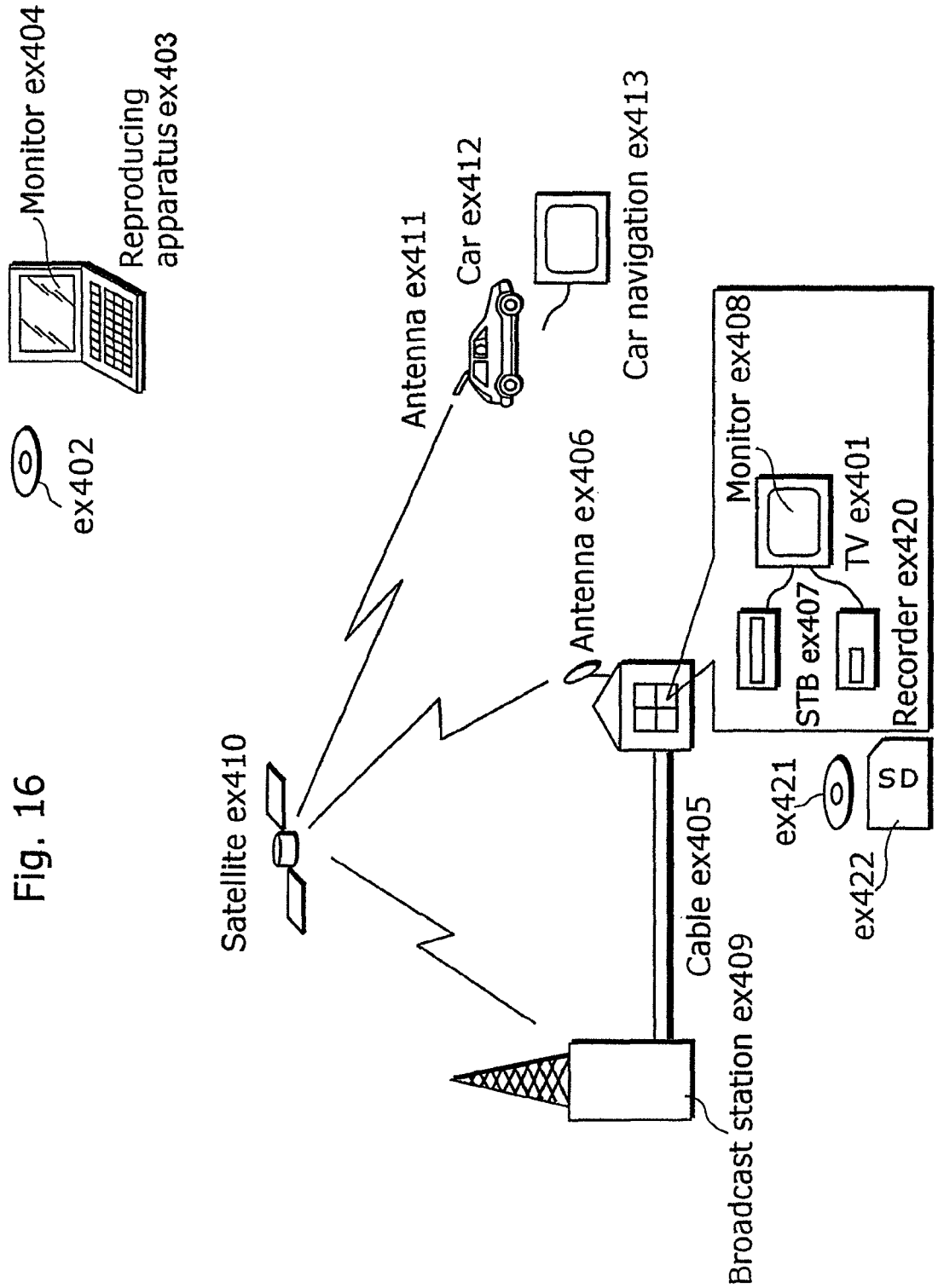
FIG. 16 is a block diagram showing an overall configuration of a digital broadcasting system according to the present invention.

The present invention is not limited to the above-mentioned system as such ground-based or satellite digital broadcasting has been in the news lately and at least either the moving picture coding apparatus or the moving picture decoding apparatus described in the above-mentioned embodiments can be incorporated into a digital broadcasting system as shown in FIG. 16. More specifically, a bit stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes the bit stream for reproduction. The moving picture decoding apparatus as shown in the above-mentioned embodiment can be implemented in the reproducing apparatus ex403 for reading out and decoding the bit stream recorded on a storage medium ex402 that is a recording medium such as CD and DVD. In this case, the reproduced video signals are displayed on a monitor ex404. It is also conceivable to implement the moving picture decoding apparatus in the set top box ex407 connected to a cable ex405 for a cable television or the antenna ex406 for satellite and/or ground-based broadcasting so as to reproduce them on a monitor ex408 of the television ex401. The moving picture decoding apparatus may be incorporated into the television, not in the set top box. Also, a car ex412 having an antenna ex411 can receive signals from the satellite ex410 or the cell site ex107 for reproducing moving pictures on a display device such as a car navigation system ex413 set in the car ex412.

Further, the moving picture coding apparatus as shown in the above-mentioned embodiments can code picture signals and record them on a recording medium. As a concrete example, a recorder ex420 such as a DVD recorder for recording picture signals on a DVD disk ex421, a disk recorder for recording them on a hard disk can be cited. They can be recorded on an SD card ex422. If the recorder ex420 includes the moving picture decoding apparatus as shown in the above-mentioned embodiment, the picture signals recorded on the DVD disk ex421 or the SD card ex422 can be reproduced for display on the monitor ex408.

Figure 15:
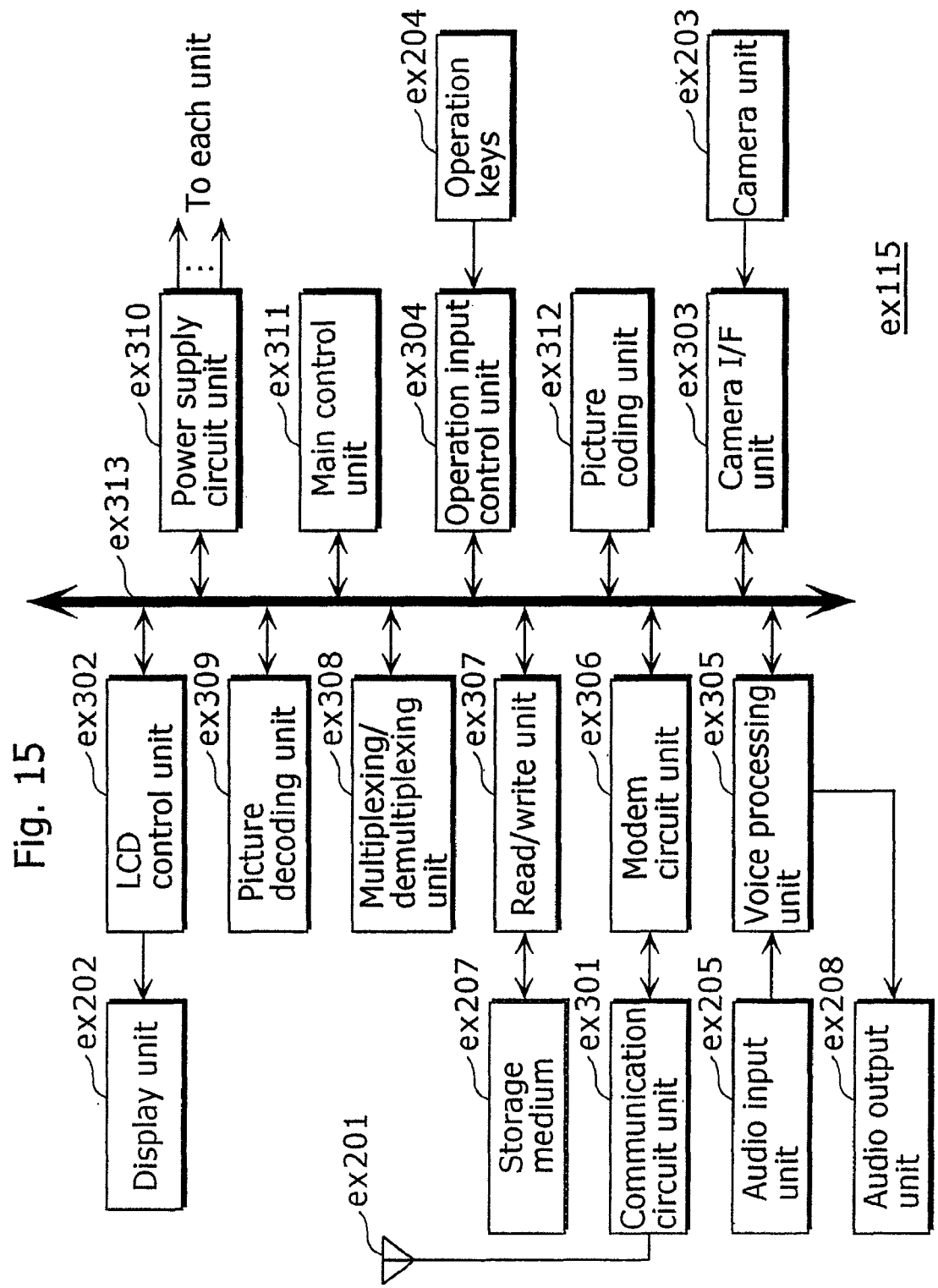
FIG. 15 is a block diagram showing the structure of the cell phone according to the present invention.

As for the structure of the car navigation system ex413, the structure without the camera unit ex203, the camera interface unit ex303 and the picture coding unit ex312, out of the components shown in FIG. 15, is conceivable. The same applies for the computer ex111, the television (receiver) ex401 and others.

In addition, three types of implementations can be conceived for a terminal such as the above-mentioned cell phone ex114; a sending/receiving terminal implemented with both an encoder and a decoder, a sending terminal implemented with an encoder only, and a receiving terminal implemented with a decoder only.

As described above, it is possible to use the moving picture prediction method, the moving picture coding apparatus and the moving picture decoding apparatus described in the above-mentioned embodiments for any of the above-mentioned devices and systems, and by using this method, the effects described in the above-mentioned embodiments can be obtained.

Up to this point, the moving picture prediction method, the moving picture coding apparatus and the moving picture decoding apparatus according to the present invention are explained based on the embodiment but the present invention is not limited to this embodiment.

For example, the judgment in FIG. 7 (the judgment about whether generation of the predictive values corresponding to T, T1 and T0 is necessary or not; Step S70) and the judgment in FIG. 9 (the judgment about whether generation of the predictive values with predetermined significant bits corresponding to T, T1 and T0 is possible or not; Step S90) are not limited to the values of the divisors (the values of the denominators) of the formulas to calculate the weighting coefficients W0 and W1 shown in the above Formulas 1 and 2. It is acceptable to judge with the values of the multipliers (the values of the numerators) or the values of the weighting coefficients W0 and W2. Further it is also acceptable to judge with the values of each pixel value in two reference pictures multiplied by the weighting coefficients W0 and W2.

INDUSTRIAL APPLICABILITY

The moving picture prediction method, the moving picture coding method and the moving picture decoding method according to the present invention are useful as the methods for generating prediction values, generating bit streams by coding each picture that constructs a moving picture, and decoding the generated bit streams with a cell phone, a DVD apparatus, a personal computer and the like.

The invention claimed is:

1. A picture coding apparatus which codes a picture on a block basis, the picture coding apparatus comprising:
    a time information determination unit operable to determine time information of a current picture to be coded, a first reference picture referred to by the current picture to be coded and a second reference picture referred to by the current picture to be coded;
    a scaling parameter calculation unit operable to calculate a scaling parameter based on a temporal distance between the first reference picture and the second reference picture;
    a weighting coefficient determination unit operable to determine two weighting coefficients based on the scaling parameter;
    a predictive pixel value generation unit operable to generate a predictive pixel value of the current picture to be coded by scaling a pixel value of the first reference picture and a pixel value of the second reference picture using the two weighting coefficients determined by said weighting coefficient determination unit; and
    a coding unit operable to code a difference value between the current picture and the predictive pixel value generated by said predictive pixel value generation unit,
    wherein the weighting coefficient determination unit is operable to:
    (i) determine the two weighting coefficients to be a predetermined value of ½ in a case that a generation of the predictive pixel value cannot be performed within a predetermined significant bit number by said predictive pixel value generation unit, and
    (ii) determine the two weighting coefficients to be a value calculated using the scaling parameter in a case that the generation of the predictive pixel value can be performed within the predetermined significant bit number by said predictive pixel value generation unit.

2. A picture coding method for coding a picture on a block basis, the picture coding method comprising:
    a time information determination step of determining time information of a current picture to be coded, a first reference picture referred to by the current picture to be coded and a second reference picture referred to by the current picture to be coded;
    a scaling parameter calculation step of calculating a scaling parameter based on a temporal distance between the first reference picture and the second reference picture;
    a weighting coefficient determination step of determining two weighting coefficients based on the scaling parameter;
    a predictive pixel value generation step of generating a predictive pixel value of the current picture to be coded by scaling a pixel value of the first reference picture and a pixel value of the second reference picture using the two weighting coefficients determined in said weighting coefficient determination step; and
    a coding step of coding a difference value between the current picture and the predictive pixel value generated in said predictive pixel value generation step,
    wherein the weighting coefficient determination step includes
    (i) determining the two weighting coefficients to be a predetermined value of ½ in a case that a generation of the predictive pixel value cannot be performed within a predetermined significant bit number in said predictive pixel value generation step, and
    (ii) determining the two weighting coefficients to be a value calculated using the scaling parameter in a case that the generation of the predictive pixel value can be performed within the predetermined significant bit number in said predictive pixel value generation step.

* * * * *